(12) United States Patent
Keller et al.

(10) Patent No.: US 6,557,048 B1
(45) Date of Patent: Apr. 29, 2003

(54) COMPUTER SYSTEM IMPLEMENTING A SYSTEM AND METHOD FOR ORDERING INPUT/OUTPUT (IO) MEMORY OPERATIONS WITHIN A COHERENT PORTION THEREOF

(75) Inventors: James B. Keller, Palo Alto, CA (US); Derrick R. Meyer, Austin, TX (US); Dale E. Gulick, Austin, TX (US); Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/431,364

(22) Filed: Nov. 1, 1999

(51) Int. Cl.$^7$ .............................................. G06F 13/00
(52) U.S. Cl. ............................ 710/6; 709/102; 710/58; 711/141; 711/146; 712/8; 712/30
(58) Field of Search ................................. 709/100–109; 710/5–7, 20–21, 40–45, 58–61, 1.5–1.7; 711/131, 140–158; 712/8, 30–37

(56) References Cited

U.S. PATENT DOCUMENTS

| | | | |
|---|---|---|---|
| 5,568,620 A | * 10/1996 | Sarangdhar et al. | 710/105 |
| 5,623,628 A | * 4/1997 | Brayton et al. | 711/141 |
| 5,644,753 A | * 7/1997 | Ebrahim et al. | 711/131 |
| 5,682,516 A | * 10/1997 | Sarangdhar et al. | 711/146 |
| 5,734,922 A | * 3/1998 | Hagersten et al. | 712/37 |
| 5,749,095 A | 5/1998 | Hagersten | |
| 5,778,438 A | * 7/1998 | Merchant | 711/146 |
| 5,881,303 A | * 3/1999 | Hagersten et al. | 712/30 |
| 5,893,165 A | * 4/1999 | Ebrahim | 711/158 |
| 5,905,998 A | * 5/1999 | Ebrahim et al. | 711/144 |
| 5,961,621 A | * 10/1999 | Wu et al. | 710/107 |
| 6,070,209 A | * 5/2000 | Hausauer | 710/104 |
| 6,101,420 A | 8/2000 | Van Doren et al. | |
| 6,108,752 A | 8/2000 | Van Doren et al. | |
| 6,167,492 A | * 12/2000 | Keller et al. | 711/154 |
| 6,209,065 B1 | 3/2001 | Van Doren et al. | |
| 6,247,086 B1 | * 6/2001 | Allingham | 710/128 |
| 6,249,846 B1 | 6/2001 | Van Doren et al. | |
| 6,275,905 B1 | * 8/2001 | Keller et al. | 711/141 |
| 6,385,705 B1 | 5/2002 | Keller et al. | |
| 6,389,526 B1 | 5/2002 | Keller et al. | |

* cited by examiner

Primary Examiner—Christopher B. Shin
(74) Attorney, Agent, or Firm—Lawrence J. Merkel; Meyertons, Hood, Kivlin, Kowert & Goetzel, P.C.

(57) ABSTRACT

A computer system is presented which implements a system and method for ordering input/output (I/O) memory operations. In one embodiment, the computer system includes a processing subsystem and an I/O subsystem. The processing subsystem includes multiple processing nodes interconnected via coherent communication links. Each processing node may include a processor executing software instructions. The I/O subsystem includes one or more I/O nodes serially coupled via non-coherent communication links. Each I/O node may embody one or more I/O functions (e.g., modem, sound card, etc.). One of the processing nodes includes a host bridge which translates packets moving between the processing subsystem and the I/O subsystem. One of the I/O nodes is coupled to the processing node including the host bridges. The I/O node coupled to the processing node produces and/or provides transactions having destinations or targets within the processing subsystem to the processing node including the host bridge. The I/O node may, for example, produce and/or provide a first transaction followed by a second transaction. The host bridge may dispatch the second transaction with respect to the first transaction according to a predetermined set of ordering rules. For example, the host bridge may: (i) receive the first and second transactions, (ii) dispatch the first transaction within the processing subsystem, and (iii) dispatch the second transaction within the processing subsystem dependent upon progress of the first transaction within the processing subsystem and the predetermined set of ordering rules.

43 Claims, 14 Drawing Sheets

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | Sh | | | | | | | |

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

| CMD Code | VChan | Command | Packet Type |
|---|---|---|---|
| 000000 | - | Nop | Info |
| 000001 | NPC | VicBlk | Command/Data |
| 000010 |  | Reserved |  |
| 000011 | NPC | ValidateBlk | Command |
| 000100 | NPC | RdBlk | Command |
| 000101 | NPC | RdBlkS | Command |
| 000110 | NPC | RdBlkMod | Command |
| 000111 | NPC | ChangetoDirty | Command |
| x01xxx | NPC or PC | WrSized | Command/Data |
| 01xxxx | NPC | ReadSized | Command |
| 100xxx |  | Reserved |  |
| 110000 | R | RdResponse | Response/Data |
| 110001 | R | ProbeResp | Response |
| 110010 | R | TgtStart | Response |
| 110011 | R | TgtDone | Response |
| 110100 | R | SrcDone | Response |
| 110101 | R | MemCancel | Response |
| 11011x |  | Reserved |  |
| 11100x | P | Probe | Command |
| 111010 | P | Broadcast | Command |
| 111011 |  | Reserved |  |
| 11110x |  | Reserved |  |
| 111110 |  | Reserved |  |
| 111111 | - | Sync | Info |

| Bit Time | 7 | 6 | 5 | 4 | 3 | 2 | 1 | 0 |
|---|---|---|---|---|---|---|---|---|
| 1 | SeqID[3:2] | | CMD[5:0] | | | | | |
| 2 | Pass PW | SeqID[1:0] | | UnitID[4:0] | | | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | | | CMD[5:0] | | | | | |
| 2 | Pass PW | | | UnitID[4:0] | | | | |
| 3 | | | | SrcTag[4:0] | | | | |
| 4 | | | | | | | | |

| CMD Code | VChan | Command | Packet Type |
|---|---|---|---|
| 000000 | - | Nop | Info |
| 000001 | | Reserved | |
| 000010 | NPC | Flush | Command |
| 000011 | | Reserved | |
| 0001xx | | Reserved | |
| x01xxx | NPC or PC | WrSized | Command/Data |
| 01xxxx | NPC | ReadSized | Command |
| 100xxx | | Reserved | |
| 110000 | R | RdResponse | Response/Data |
| 110001 | | Reserved | |
| 110010 | | Reserved | |
| 110011 | R | TgtDone | Response |
| 11010x | | Reserved | |
| 110110 | | Reserved | |
| 110111 | R | AssignAck | Response |
| 11100x | | Reserved | |
| 111010 | PC | Broadcast | Command |
| 111011 | | Reserved | |
| 11110x | | Reserved | |
| 111110 | - | Assign | Info |
| 111111 | - | Sync | Info |

| Row pass Column? | Posted Request | Non-Posted Request | Response |
|---|---|---|---|
| Posted Request | PassPW: X <br> !PassPW: No | Yes | Yes |
| Non-Posted Request | PassPW: X <br> !PassPW: No | X | X |
| Response | PassPW: X <br> !PassPW: No | Yes | X |

| $Request_1$ Type | $Request_2$ Type | Wait Requirements |
|---|---|---|
| Memory Write | Memory Write | 1. $Cmd_2$ must wait for $TgtStart_1$. <br> 2. $SrcDone_2$ must wait for $TgtDone_1$. <br> 3. $TgtDone_2$ on the non-coherent link (if required) must wait for $TgtDone_1$. |
| Memory Write | Memory Read | 1. $Cmd_2$ must wait for $TgtStart_1$. <br> 2. $TgtDone_2$ on the non-coherent link must wait for TgtDone1. |
| Memory Read | Memory Request | $Cmd_2$ must wait for $TgtStart_1$. |
| Memory Write | I/O Request or Interrupt | $Cmd_2$ must wait for $TgtDone_1$. |
| Memory Read | I/O Request | $Cmd_2$ must wait for $TgtStart_1$. |
| Memory Write | Flush | $TgtDone_2$ on the non-coherent link must wait for $TgtDone_1$. (Flush does not cause any requests to be issued to the coherent fabric.) |
| Memory Read | Flush or Interrupt | No wait requirements |
| Memory Write | Response | $Response_2$ must wait for $TgtDone_1$. |
| Memory Read | Response | $Response_2$ must wait for $TgtStart_1$. |
| I/O Request | Memory Request | $Cmd_2$ must wait for $TgtStart_1$. |
| I/O Request | I/O Request or Interrupt | $Cmd_2$ must wait for $TgtStart_1$. |
| I/O Request | Flush | $TgtDone_2$ on the non-coherent link must wait for $TgtStart_1$. (Flush does not cause any requests to be issued to the coherent fabric.) |
| I/O Request | Response | $Response_2$ must wait for $TgtStart_1$. |
| Flush | Anything | No wait requirements. |
| Response | Anything | No wait requirements. |
|  |  |  |
|  |  |  |
| Interrupt | Anything | No wait requirements. |
| SysMgt Write | Response | $Response_2$ must wait for $TgtDone_1$. |

| Bit Time | 7 | 6 | 5 | 4 | 3 | 2 | 1 | 0 |
|---|---|---|---|---|---|---|---|---|
| 1 | SeqId[3:2] | | Cmd[5:0] | | | | | |
| 2 | Pass PW | SeqId[1:0] | | UnitID[4:0] | | | | |
| 3 | Mask/Count[1:0] | | Compat | SrcTag[4:0] | | | | |
| 4 | Addr[7:2] | | | | | | Mask/Count[3:2] | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 14

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | MaskCount[1:0] | | Compat | SrcTag[4:0] | | | | |
| 4 | Addr[7:2] | | | | | | Mask/Count[3:2] | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 15

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | TgtNode[2:0] | | | TgtUnit[1:0] | | SrcNode[2:0] | | |
| 3 | MD | Rsv | | SrcTag[4:0] | | | | |
| 4 | Addr[7:3] | | | | | NextState[1:0] | | RD |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

FIG. 17

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Shared | Rsv | | Rsv | | | | |

FIG. 18

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Rsv | | | Rsv | | | | |

FIG. 19

| Bit Time | 7 | 6 | 5 | 4 | 3 | 2 | 1 | 0 |
|---|---|---|---|---|---|---|---|---|
| 1 | Rsv | | Cmd[5:0] | | | | | |
| 2 | Pass-PW | Bridge | Rsv | UnitID[4:0] | | | | |
| 3 | Rsv | | Error | SrcTag[4:0] | | | | |
| 4 | Rsv | | | | | | Rsv | |

FIG. 20

| Bit Time | 7 | 6 | 5 | 4 | 3 | 2 | 1 | 0 |
|---|---|---|---|---|---|---|---|---|
| 1 | SrcUnit[1:0] | | Cmd[5:0] | | | | | |
| 2 | DestNode[2:0] | | | DestUnit[1:0] | | SrcNode[2:0] | | |
| 3 | Rsv | | Error | SrcTag[4:0] | | | | |
| 4 | Rsv | | | | | Cancel | Rsv | |

FIG. 21

| Bit Time | 7 | 6 | 5 | 4 | 3 | 2 | 1 | 0 |
|---|---|---|---|---|---|---|---|---|
| 1 | Seqld[3:2] | | Cmd[5:0] | | | | | |
| 2 | Pass-PW | Seqld[1:0] | | UnitID[4:0] | | | | |
| 3 | Rsv | | | SrcTag[4:0] | | | | |
| 4 | Rsv | | | | | | | |

COMPUTER SYSTEM IMPLEMENTING A SYSTEM AND METHOD FOR ORDERING INPUT/OUTPUT (IO) MEMORY OPERATIONS WITHIN A COHERENT PORTION THEREOF

BACKGROUND OF THE INVENTION

1. Field of the Invention

This invention is related to the field of computer systems and, more particularly, to computer systems wherein input/output (I/O) operations access memory.

2. Description of the Related Art

Generally, personal computers (PCs) and other types of computer systems have been designed around a shared bus system for accessing memory. One or more processors and one or more input/output (I/O) devices are coupled to memory through the shared bus. The I/O devices may be coupled to the shared bus through an I/O bridge which manages the transfer of information between the shared bus and the I/O devices, while processors are typically coupled directly to the shared bus or are coupled through a cache hierarchy to the shared bus.

Unfortunately, shared bus systems suffer from several drawbacks. For example, the multiple devices attached to the shared bus present a relatively large electrical capacitance to devices driving signals on the bus. In addition, the multiple attach points on the shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced.

On the other hand, distributed memory systems lack many of the above disadvantages. A computer system with a distributed memory system includes multiple nodes, two or more of which are coupled to different memories. The nodes are coupled to one another using any suitable interconnect. For example, each node may be coupled to each other node using dedicated lines. Alternatively, each node may connect to a fixed number of other nodes, and transactions may be routed from a first node to a second node to which the first node is not directly connected via one or more intermediate nodes. A memory address space of the computer system is assigned across the memories in each node.

In general, a "node" is a device which is capable of participating in transactions upon the interconnect. For example, the interconnect may be packet based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. Alternatively, a node located on a communication path between the source and target nodes may relay the packet from the source node to the target node.

Distributed memory systems present design challenges which differ from the challenges in shared bus systems. For example, shared bus systems regulate the initiation of transactions through bus arbitration. Accordingly, a fair arbitration algorithm allows each bus participant the opportunity to initiate transactions. The order of transactions on the bus may represent the order that transactions are performed (e.g. for coherency purposes). On the other hand, in distributed systems, nodes may initiate transactions concurrently and use the interconnect to transmit the transactions to other nodes. These transactions may have logical conflicts between them (e.g. coherency conflicts for transactions involving the same address) and may experience resource conflicts (e.g. buffer space may not be available in various nodes) since no central mechanism for regulating the initiation of transactions is provided. Accordingly, it is more difficult to ensure that information continues to propagate among the nodes smoothly and that deadlock situations (in which no transactions are completed due to conflicts between the transactions) are avoided.

In a computer system having a distributed memory system, memory operations (e.g., read and write operations) originating from I/O nodes may need to be properly ordered with respect to other pending memory operations in order to preserve memory coherency within the computer system and to satisfy ordering requirements expected by the I/O nodes. For example, memory operations may need to be completed in the order in which they were generated (i.e., in chronological order) in order to preserve memory coherency within the computer system and to satisfy I/O ordering requirements. It would thus be desirable to have a computer system implementing a system and method for properly ordering I/O memory operations.

SUMMARY OF THE INVENTION

A computer system is presented which implements a system and method for ordering input/output (I/O) memory operations. In one embodiment, the computer system includes a processing subsystem and an I/O subsystem. The processing subsystem includes multiple processing nodes interconnected via coherent communication links. Each processing node may include a processor preferably executing software instructions (e.g., a processor core configured to execute instructions of a predefined instruction set). The I/O subsystem includes one or more I/O nodes coupled via non-coherent communication links one after another in series or daisy chain fashion. Each I/O node may embody one or more I/O functions (e.g., modem, sound card, etc.). One of the processing nodes includes a host bridge which translates packets moving between the processing subsystem and the I/O subsystem. One of the I/O nodes is coupled to the processing node including the host bridge via a non-coherent communication link.

The I/O node coupled to the processing node produces and/or provides transactions having a destination or target within the processing subsystem to the processing node including the host bridge. The I/O node may, for example, produce and/or provide a first transaction followed by a second transaction. The host bridge may dispatch the second transaction with respect to the first transaction according to a predetermined set of ordering rules. For example, the host bridge may: (i) receive the first and second transactions from the I/O node, (ii) dispatch the first transaction within the processing subsystem, and (iii) dispatch the second transaction within the processing subsystem dependent upon progress of the first transaction within the processing subsystem according to the predetermined set of ordering rules.

The computer system may include one or more memory units within the processing subsystem. For example, the computer system may include multiple memories such that each memory is coupled to a different one of the multiple processing nodes. The first transaction may be a write transaction for storing data within a first memory coupled to a first processing node. In response to the first transaction, the first processing node may produce a target start packet directed to the host bridge (e.g., after ordering the first transaction with respect to other transactions pending within the first processing node). The second transaction may be a write transaction for storing, data within a second memory coupled to a second processing node. Acting in accordance with the predetermined set of ordering rules, the host bridge may delay dispatching the second transaction until the target start packet resulting from the first transaction is received.

In a second embodiment of the computer system, the host bridge may delay completion of the second transaction with respect to the first transaction according to the predetermined set of ordering rules. For example, the first transaction may be a posted write transaction for storing data within the first memory. In response to the first transaction, the first processing node may produce a first target done packet directed to the host bridge. For example, the first processing node may produce the first target done packet after the first transaction has reached a "point of coherency" within the computer system. The first transaction may have reached the point of coherency within the computer system when the first transaction is: (i) properly ordered within the first processing node with respect to other transactions pending within the first processing node, and (ii) a correct coherency state with respect to the first transaction has been established in the other processing nodes.

The second transaction may be a Flush command from the same I/O node which issued the first transaction. The Flush command may ensure that posted write transactions issued prior to the Flush command by the I/O node have at least reached points of coherency within the computer system. The second transaction may be complete when the host bridge dispatches a second target done packet to the I/O node. Acting in accordance with the predetermined set of ordering rules, the host bridge may delay issuance of the second target done packet to the I/O node until the first target done packet resulting from the first transaction is received from the first processing node.

In a first method for use in the computer system described above, the I/O subsystem provides a first transaction and a second transaction to the host bridge, wherein the second transaction follows the first. The host bridge: (i) dispatches the first transaction within the processing subsystem, and (ii) dispatches the second transaction within the processing subsystem dependent upon progress of the first transaction within the processing subsystem and the predetermined set of ordering rules. In a second method for use in the computer system described above, the I/O subsystem provides the first and second transactions to the host bridge. The host bridge: (i) dispatches the first transaction within the processing subsystem, and (ii) delays completion of the second transaction with respect to the first transaction according to the predetermined set of ordering rules.

BRIEF DESCRIPTION OF THE DRAWINGS

Other objects and advantages of the invention will become apparent upon reading the following detailed description and upon reference to the accompanying drawings in which:

FIG. 3 is a diagram of an exemplary coherent information packet which may be employed within the processing subsystem;

FIG. 4 is a diagram of an exemplary coherent command packet which may be employed within the processing subsystem;

FIG. 5 is a diagram of an exemplary coherent response packet which may be employed within the processing subsystem;

FIG. 6 is a diagram of an exemplary coherent data packet which may be employed within the processing subsystem;

FIG. 7 is a table listing different types of coherent command packets which may be employed within the processing subsystem;

FIG. 8 is a diagram of an exemplary non-coherent command packet which may be employed within the I/O subsystem;

FIG. 9 is a diagram of an exemplary non-coherent response packet which may be employed within the I/O subsystem;

FIG. 10 is a table listing different types of non-coherent command packets which may be employed within the I/O subsystem;

FIG. 11 is a table listing ordering rules which may be implemented regarding packets traveling in different virtual channels of the I/O subsystem;

FIG. 12 is a table listing ordering rules which may be implemented by the host bridge regarding transactions originating within the I/O subsystem and entering the processing subsystem;

FIG. 14 is a diagram of an exemplary non-coherent sized write command packet format;

FIG. 15 is a diagram of an exemplary coherent sized write command packet format;

FIG. 17 is a diagram of one embodiment of a probe command packet;

FIG. 18 is a diagram of one embodiment of a probe response packet;

FIG. 19 is a diagram of one embodiment of a coherent target done response packet;

FIG. 20 is a diagram of one embodiment of a non-coherent target done response packet;

FIG. 21 is a diagram of one embodiment of a coherent source done response packet;

Figure 1:
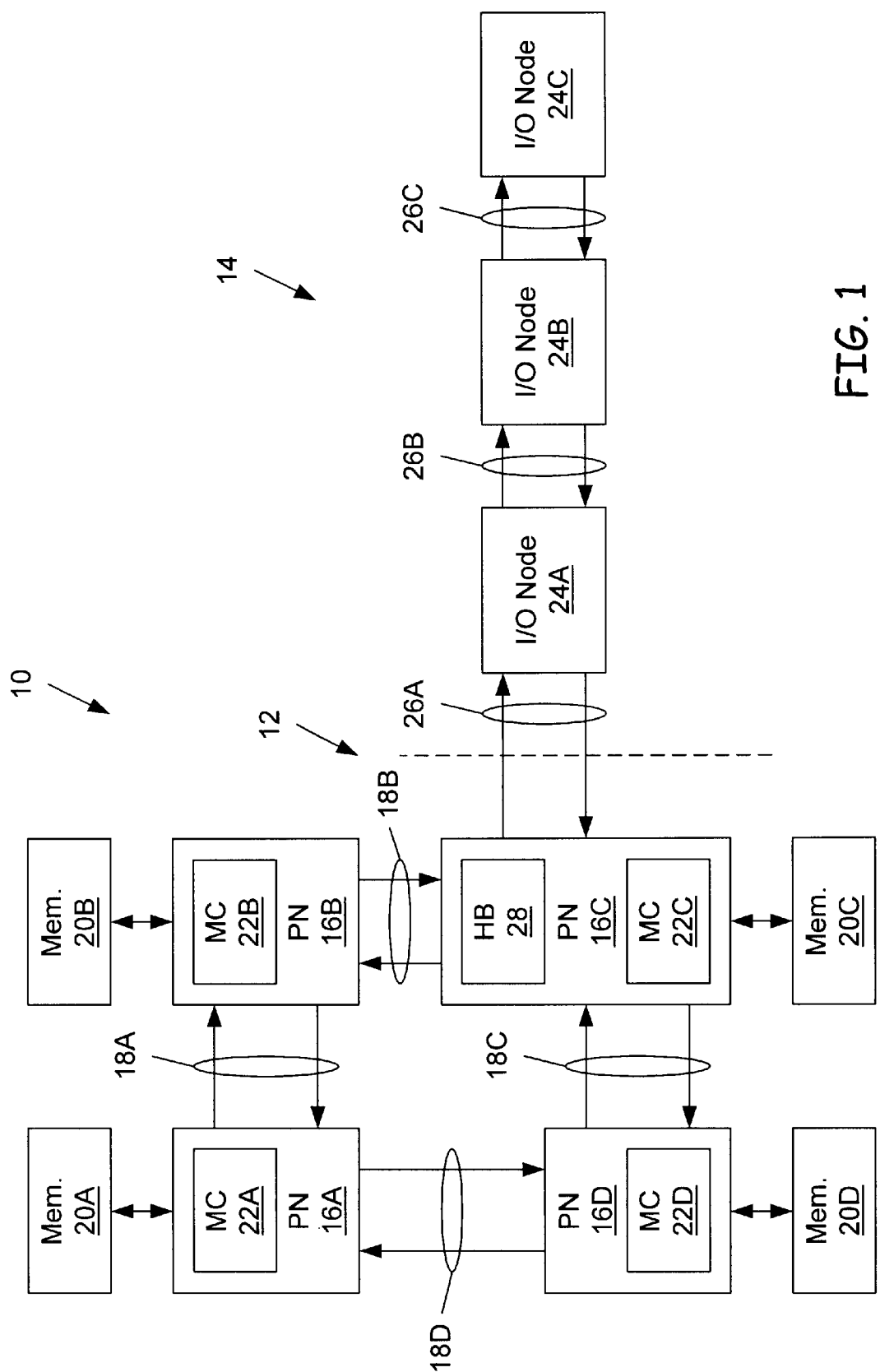
FIG. 1 is a block diagram of one embodiment of a computer system including a processing subsystem and an input/output (I/O) subsystem, wherein the processing subsystem includes several processing nodes, and wherein one of the processing nodes includes a host bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of one embodiment of a computer system 10 including a processing subsystem 12 and an input/output (I/O) subsystem 14. Other embodiments of computer system 10 are possible and contemplated. Processing subsystem 12 includes several processing nodes (PN) 16A, 16B, 16C, and 16D. Processing node 16A is coupled to processing node 16B via a bidirectional communication link 18A. Similarly, processing node 16B is coupled to processing node 16C by a bidirectional communication link 18B, processing node 16C is coupled to processing node 16D by a bidirectional communication link 18C, and processing node 16D is coupled to processing node 16A by a bidirectional communication link 18D. As indicated in FIG. 1 and described in more detail below, each bidirectional communication link 18 within processing subsystem 12 may include two unidirectional sets of transmission media (e.g., wires).

Each processing node 16A–16D is coupled to a respective memory 20A–20D via a memory controller (MC) 22A–22D included within each respective processing node 16A–16D. As will be described in more detail below, a memory address space of computer system 10 is assigned across memories 20A–20D such that computer system 10 has a distributed memory system.

I/O subsystem 14 includes several I/O nodes 24A, 24B, and 24C. Each I/O node 24 may embody one or more I/O functions (e.g., modem, sound card, etc.). I/O node 24A is coupled to processing node 16C via a bidirectional communication link 26A. Similarly, I/O node 24B is coupled to I/O node 24A via a bidirectional communication link 26B, and I/O node 24C is coupled to I/O node 24B via a bidirectional communication link 26C. I/O nodes 22A–22C are thus coupled one after another in series or daisy chain fashion. As indicated in FIG. 1 and described in more detail below, each directional communication link 26 within I/O subsystem 14 may include two directional sets of transmission media (e.g., wires).

Figure 2:
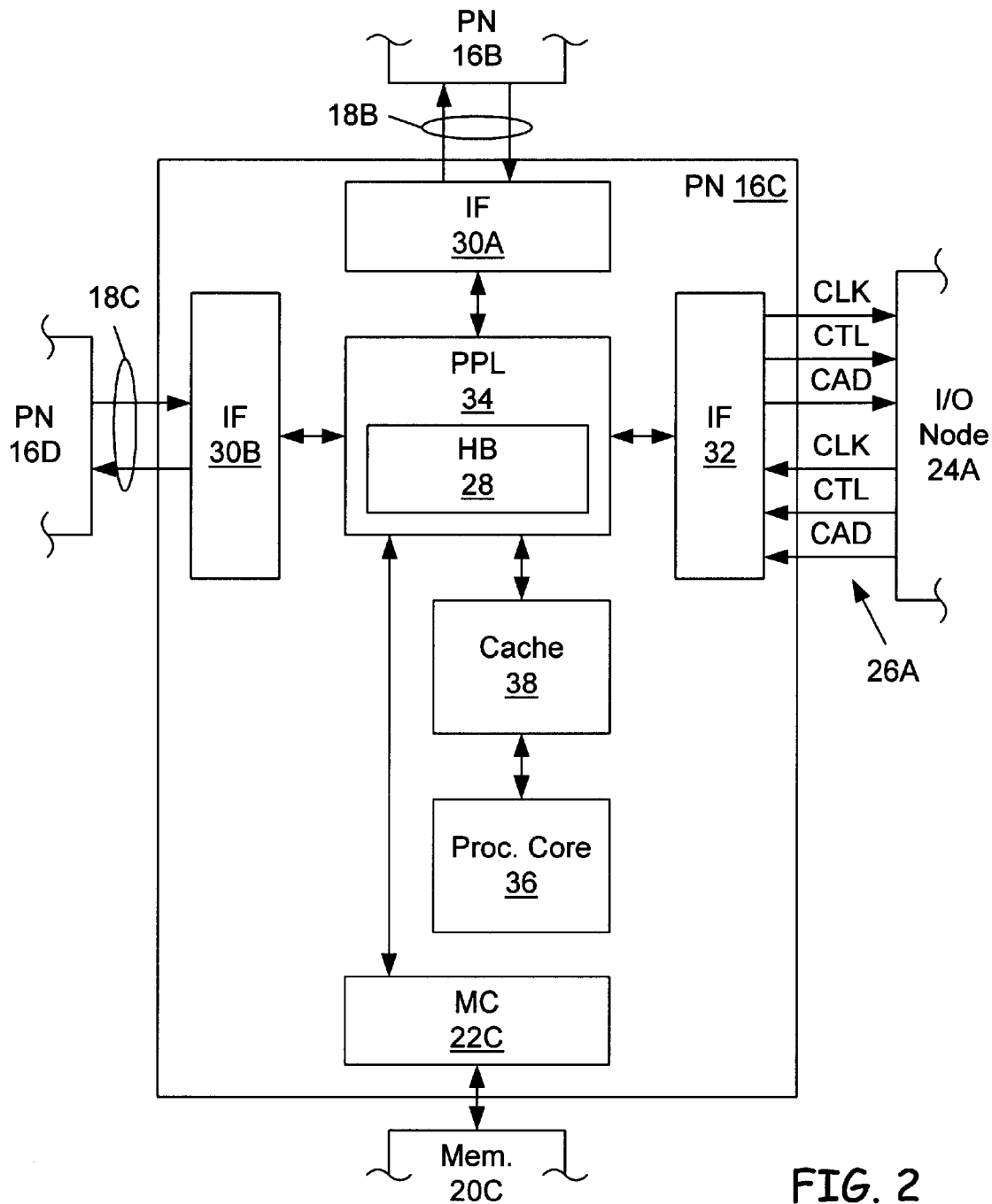
FIG. 2 is a block diagram of one embodiment of the processing node of FIG. 1 including the host bridge.

Processing node 16C includes a host bridge 28 forming an interface between I/O subsystem 14 and processing subsystem 12. FIG. 2 is a block diagram of one embodiment of processing node 16C of FIG. 1. In addition to memory controller 20C, processing node 16C includes a communication interface (IF) 30A coupled to link 18B, a communication interface 30B coupled to link 18C, and a communication interface 32 to link 26A. Processing node 16C communicates with processing nodes 16B and 16D via respective interfaces 30A and 30B, and communicates with I/O node 24A via interface 32. Packet processing logic (PPL) 34 includes host bridge 28, and is coupled to interfaces 30A, 30B, and 32, and to memory controller 22C. Processing node 16C also includes a processor core 36 coupled to a cache memory 38. Cache 38 is coupled to packet processing logic 34.

Processor core 36 preferably includes circuitry for executing instructions according to a predefined instruction set. For example, the x86 instruction set architecture may be selected. Alternatively, the Alpha, PowerPC, or any other instruction set architecture may be selected. Generally, processor core 36 accesses cache 38 for instructions and data. If needed instructions and/or data is not present within cache 38 (i.e., a cache miss is detected), a read request is generated and transmitted to the memory controller within the processing node to which the missing cache block is mapped.

Each processing node 16 in FIG. 1 may include a processor core similar to processor core 36, a cache similar to cache 38, packet processing logic similar to packet processing logic 34 (minus host bridge 28), and interfaces similar to interfaces 30. Alternately, each processing node 16 may include packet processing logic 34 with host bridge 28, and host bridge 28 in processing nodes 16A, 16B, and 16D may be idle.

Memories 20A–20D in FIG. 1 may include any suitable memory devices. For example, each memory 20 may include one or more RAMBUS DRAMs (RDRAMs), synchronous DRAMs (SDRAMs), static RAM, etc. As described above, the address space of computer system 10 is divided among memories 20A–20D. Each processing node 16A–16D may include a memory map used to determine which addresses are mapped to each of the memories 20A–20D, and hence to which processing node 16A–16D a memory request for a particular address should be routed.

Memory controllers 22A–22D coupled to respective memories 20A–20D include control circuitry for interfacing to memories 20A–20D. Memory controllers 22A–22D may include request queues for queuing memory access requests. Where multiple processing nodes 16 include caches similar to cache 38, memory controllers 22A–22D may be responsible for ensuring that memory accesses to respective memories 20A–20D occur in a cache coherent fashion.

As indicated in FIGS. 1 and 2 and described above bidirectional communication links 18 and 26 may include two unidirectional sets of transmission media (e.g., wires). Communication link 26A in FIG.,2 includes a first set of three unidirectional transmission media directed from interface 32 to I/O node 24A, and a second set of three unidirectional transmission media directed from I/O node 24A to interface 32. Both the first and second sets include separate transmission media for a clock (CLK) signal, a control (CTL) signal, and a command/address/data (CAD) signal. In a preferred embodiment, the CLK signals serves as a clock signal for the CTL and CAD signals. A separate CLK signal may be provided for each 8-bit byte of the CAD signal. The CAD signal is used to convey control packets and data packets. Types of control packets include command packets and response packets. The CAD signal may be, for example, 8, 16, or 32 bits wide, and may thus include 8, 16, or 32 separate transmission media.

The CTL signal is asserted when the CAD signal conveys a command packet, and is deasserted when the CAD signal conveys a data packet. The CTL and CAD signals may transmit different information on the rising and falling edges of the CLK signal. Accordingly, two data units may be transmitted in each period of the CLK signal. Communication link 26A in FIG. 2 and described above is preferably typical of communication links 18 within processing subsystem 12 and communication links 26 within I/O subsystem 14.

Processing nodes 16A–16D implement a packet-based link for inter-processing node communication. Communication links 18 are used to transmit packets between processing nodes 16 within processing subsystem 12, and are operated in a "coherent" fashion such that processing subsystem 12 preserves the coherency of data stored within memories 20A–20D and the caches of processing nodes 16A–16D.

I/O nodes 24A–24C also implement a packet-based link for inter-I/O node communication. Communication links 26B and 26C are used to transmit packets between I/O nodes 24 within I/O subsystem 14, and communication link 26A is used to transmit packets between I/O node 24A and processing node 16C. Communication links 26A–26C are operated in a "non-coherent" fashion as system memory is not distributed within I/O subsystem 14.

Interface logic used within computer system 10 (e.g., interface logic 30A–30B and 32) may include buffers for receiving packets from a communication link and for buffering packets to be transmitted upon the communication link. Computer system 10 may employ any suitable flow control mechanism for transmitting packets. For example, interface logic within each node may store a count of the number of each type of buffer within interface logic of a receiver node at the other end of a communication link. A sending node may not transmit a packet unless the receiving node has a free buffer of the correct type for storing the packet. As each buffer is freed within the receiving node (e.g., by forwarding a stored packet), the receiving node transmits a message to the sending node indicating that the buffer has been freed. Such a mechanism may be referred to as a "coupon-based" system.

A packet transmitted within computer system 10 may pass through one or more intermediate processing and/or I/O nodes. For example, a packet transmitted by processing node 16A to processing node 16C within processing subsystem 12 may pass through either processing node 16B or processing node 16D. (See FIG. 1.) Any suitable packet routing algorithm may be used within processing subsystem 12. Packets transmitted within I/O subsystem 14 are either transmitted in a direction toward processing node 16C (i.e., "upstream") or in a direction away from processing node 16C (i.e., "downstream"), and may pass through one or more intermediate I/O nodes 24. For example, a packet transmitted by I/O node 24C to I/O node 24A passes through I/O node 24B. Other embodiments of computer system 10 may include more or fewer processing nodes 16 and/or I/O nodes 24 than the embodiment of FIG. 1.

The coherent packets used within processing subsystem 12 and the non-coherent packets used in I/O subsystem 14 may have different formats, and may include different data. As will be described in more detail below, host bridge 28 within processing node 16C translates packets moving from one subsystem to the other. For example, a non-coherent packet transmitted by I/O node 24B and having a target within processing node 16A passes through I/O node 24A to processing node 16C. Host bridge 28 within processing node 16C translates the non-coherent packet to a corresponding coherent packet. Processing node 16C may transmit the coherent packet to either processing node 16B or processing node 16D. If processing node 16C transmits the coherent packet to processing node 16B, processing node 16B may receive the packet, then forward the packet to processing node 16A. On the other hand, if processing node 16C transmits the coherent packet to processing node 16D, processing node 16D may receive the packet, then forward the packet to processing node 16A.

Coherent Packets Within Processing Subsystem 12

FIGS. 3–6 illustrate exemplary coherent packet formats which may be employed within processing subsystem 12. FIGS. 3–5 illustrate exemplary coherent control packets and FIG. 6 illustrates an exemplary coherent data packet. A control packet is a packet carrying control information regarding the transaction. Types of coherent control packets include information (info) packets, command packets, and response packets. Certain control packets specify that a data packet follows. The data packet carries data associated with the transaction and the preceding control packet. Other embodiments may employ different packet formats.

The exemplary packet formats of FIGS. 3–6 show the contents of bits 7–0 of 8-bit bytes transmitted in parallel during consecutive "bit times". The amount of time used to transmit each data unit of a packet (e.g., byte).is referred to herein as a "bit time". Each bit time is a portion of a period of the CLK signal. For example, within a single period of the CLK signal, a first byte may be transmitted on a rising edge of the CLK signal, and a different byte may be transmitted on the falling edge of the CLK signal. In this case, the bit time is half the period of the CLK signal. Bit times for which no value is provided in the figures may either be reserved for a given packet, or may be used to transmit packet-specific information. Fields indicated by dotted lines indicate optional fields which may not be included in all of the packets of a certain type.

FIG. 3 is a diagram of an exemplary coherent information (info) packet 40 which ay be employed within processing subsystem 12. Info packet 40 includes 4 bit times on an 8-bit coherent communication link. A 6-bit command field Cmd [5:0] is transmitted during the first bit time. The control packets of FIGS. 4 and 5 include a similar command encoding in the same bit positions during bit time 1. Info packet 40 may be used to transmit messages between processing nodes when the messages do not include a memory address. Additionally, info packets may be used to transmit the messages indicating the freeing of buffers in the coupon-based flow control scheme described above.

FIG. 4 is a diagram of an exemplary coherent command packet 42 which may be employed within processing subsystem 12. Command packet 42 comprises 8 bit times on an 8-bit coherent communication link. Command packet 42 may be used to initiate a transaction (e.g. a read or write transaction), as well as to transmit commands in the process of carrying out the transaction for those commands which carry the memory address affected by the transaction. Generally, a command packet indicates an operation to be performed by the destination node.

The bits of a command field Cmd[5:0] identifying the type of command are transmitted during bit time 1. Bits of a source unit field SrcUnit[1:0] containing a value identifying a source unit within the source node are also transmitted during bit time 1. Types of units within computer system 10 may include memory controllers, caches, processors, etc. Bits of a source node field SrcNode[2:0] containing a value identifying the source node are transmitted during bit time 2. Bits of a destination node field DestNode[2:0] containing a value which uniquely identifies the destination node may also be transmitted during the second bit time, and may be used to route the packet to the destination node. Bits of a destination unit field DestUnit[1:0] containing a value identifying the destination unit within the destination node which is to receive the packet may also be transmitted during the second bit time.

Many command packets may also include bits of a source tag field SrcTag[4:0] in bit time 3 which, together with the source node field SrcNode[2:0] and the source unit field SrcUnit[1:0], may link the packet to a particular transaction of which it is a part. Bit time 4 may be used in some commands to transmit the least significant bits of the memory address affected by the transaction. Bit times 5–8 are used to transmit the bits of an address field Addr[39:8] containing the most significant bits of the memory address affected by the transaction. Some of the undefined fields in packet 42 may be used in various command packets to carry packet-specific information.

FIG. 5 is a diagram of an exemplary coherent response packet 44 which may be employed within processing subsystem 12. Response packet 44 includes the command field Cmd[5:0], the destination node field DestNode[2:0], and the destination unit field DestUnit[1:0]. The destination node field DestNode[2:0] identifies the destination node for the response packet (which may, in some cases, be the source node or target node of the transaction). The destination unit field DestUnit[1:0] identifies the destination unit within the destination node. Various types of response packets may include additional information. For example, a read response packet may indicate the amount of read data provided in a following data packet. Probe responses may indicate whether or not a copy of the requested cache block is being retained by the probed node (using the optional shared bit "Sh" in bit time 4).

Generally, response packet 44 is used for commands during the carrying out of a transaction which do not require transmission of the memory address affected by the transaction. Furthermore, response packet 44 may be used to transmit positive acknowledgement packets to terminate a transaction. Similar to the command packet 42, response packet 44 may include the source node field SrcNode[2:0], the source unit field SrcUnit[1:0], and the source tag field SrcTag[4:0] for many types of responses (illustrated as optional fields in FIG. 5).

FIG. 6 is a diagram of an exemplary coherent data packet 46 which may be employed within processing subsystem 12. Data packet 46 of FIG. 6 includes 8 bit times on an 8-bit coherent communication link. Data packet 46 may comprise different numbers of bit times dependent upon the amount of data being transferred. For example, in one embodiment a cache block comprises 64 bytes and hence 64 bit times on an eight bit link. Other embodiments may define a cache block to be of a different size, as desired. Additionally, data may be transmitted in less than cache block sizes for non-cacheable reads and writes. Data packets for transmitting data less than cache block size employ fewer bit times. In one embodiment, non-cache block sized data packets may transmit several bit times of byte enables prior to transmitting the data to indicate which data bytes are valid within the data packet. Furthermore, cache block data may be returned as an 8-byte quadword addressed by the least significant bit of the request address first, followed by interleaved return of the remaining quadwords.

FIGS. 3–6 illustrate packets for 8-bit coherent communication links. Packets for 16 and 32 bit links may be formed by concatenating consecutive bit times of FIGS. 3–6. For example, bit time 1 of a packet on a 16-bit link may comprise the information transmitted during bit times 1 and 2 on the 8-bit link. Similarly, bit time 1 of the packet on a 32-bit link may comprise the information transmitted during bit times 1–4 on the 8-bit link.

FIG. 7 is a table 48 listing different types of coherent command packets which may be employed within processing subsystem 12. Other embodiments of processing subsystem 12 are possible and contemplated, and may include other suitable sets of command packets and command field encodings. Table 48 includes a command code column including the contents of command field Cmd[5:0] for each coherent command packet, a command column naming the command, and a packet type column indicating which of coherent command packets 40, 42, and 44 (and data packet 46, where specified) is employed for that command.

A read transaction may be initiated using a sized read (ReadSized) command, a read block (RdBlk) command, a read block shared (RdBlkS) command, or a read block with modify (RdBlkMod) command. The ReadSized command is used for non-cacheable reads or reads of data other than a cache block in size. The amount of data to be read is encoded into the ReadSized command packet. For reads of a cache block, the RdBlk command may be used unless: (i) a writeable copy of the cache block is desired, in which case the RdBlkMod command may be used; or (ii) a copy of the cache block is desired but no intention to modify the block is known, in which case the RdBlkS command may be used. The RdBlkS command may be used to make certain types of coherency schemes (e.g. directory-based coherency schemes) more efficient.

In general, the appropriate read command is transmitted from the source node initiating the transaction to a target node which owns the memory corresponding to the cache block. The memory controller in the target node transmits Probe commands (indicating return of probe responses to the source of the transactions) to the other nodes in the system to maintain coherency by changing the state of the cache block in those nodes and by causing a node including an updated copy of the cache block to send the cache block to the source node. Each node receiving a Probe command transmits a probe response (ProbeResp) packet to the source node.

If a probed node has a modified copy of the read data (i.e. dirty data), that node transmits a read response (RdResponse) packet and the dirty data to the source node. A node transmitting dirty data may also transmit a memory cancel (MemCancel) response packet to the target node in an attempt to cancel transmission by the target node of the requested read data. Additionally, the memory controller in the target node transmits the requested read data using a RdResponse response packet followed by the data in a data packet.

If the source node receives a RdResponse response packet from a probed node, the received read data is used. Otherwise, the data from the target node is used. Once each of the probe responses and the read data is received in the source node, the source node transmits a source done (SrcDone) response packet to the target node as a positive acknowledgement of the termination of the transaction.

A write transaction may be initiated using a sized write (WrSized) command or a victim block (VicBlk) command followed by a corresponding data packet. The WrSized command is used for non-cacheable writes or writes of data other than a cache block in size. To maintain coherency for WrSized commands, the memory controller in the target node transmits Probe commands (indicating return of probe response to the target node of the transaction) to each of the other nodes in the system. In response to Probe commands, each probed node transmits a ProbeResp response packet to the target node. If a probed node is storing dirty data, the probed node responds with a RdResponse response packet and the dirty data. In this manner, a cache block updated by the WrSized command is returned to the memory controller for merging with the data provided by the WrSized command. The memory controller, upon receiving probe responses from each of the probed nodes, transmits a target done (TgtDone) response packet to the source node to provide a positive acknowledgement of the termination of the transaction. The source node replies with a SrcDone response packet.

A victim cache block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

A change to dirty (ChangetoDirty) command packet may be transmitted by a source node in order to obtain write permission for a cache block stored by the source node in a non-writeable state. A transaction initiated with a ChangetoDirty command may operate similar to a read except that the target node does not return data. A validate block (ValidateBlk) command may be used to obtain write permission to a cache block not stored by a source node if the source node intends to update the entire cache block. No data is transferred to the source node for such a transaction, but otherwise operates similar to a read transaction.

A target start (TgtStart) response may be used by a target to indicate that a transaction has been started (e.g. for ordering of subsequent transactions). A no operation (Nop) info packet may be used to transfer flow control information between nodes (e.g., buffer free indications). A Broadcast command may be used to broadcast messages between nodes (e.g., to distribute interrupts). Finally, a synchronization (Sync) info packet may be used to synchronize node operations (e.g. error detection, reset, initialization, etc.).

Table 48 of FIG. 7 also includes a virtual channel Vchan column. The Vchan column indicates the virtual channel in which each packet travels (i.e. to which each packet belongs). In the present embodiment, four virtual channels are defined: a non-posted command (NPC) virtual channel, a posted command (PC) virtual channel, response (R) virtual channel, and a probe (P) virtual channel.

Generally speaking, a "virtual channel" is a communication path for carrying packets between various processing nodes. Each virtual channel is resource-independent of the other virtual channels (i.e. packets flowing in one virtual channel are generally not affected, in terms of physical transmission, by the presence or absence of packets in another virtual channel). Packets are assigned to a virtual channel based upon packet type. Packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels, and by implementing the transmission medium within the computer system such that packets in separate virtual channels cannot block each other's transmission, deadlock-free operation may be achieved. It is noted that the packets from different virtual channels are transmitted over the same physical links (e.g. lines 24 in FIG. 1). However, since a receiving buffer is available prior to transmission, the virtual channels do not block each other even while using this shared resource.

Each different packet type (e.g. each different command field Cmd[5:0]) could be assigned to its own virtual channel. However, the hardware to ensure that virtual channels are physically conflict-free may increase with the number of virtual channels. For example, in one embodiment, separate buffers are allocated to each virtual channel. Since separate buffers are used for each virtual channel, packets from one virtual channel do not physically conflict with packets from another virtual channel (since such packets would be placed in the other buffers). It is noted, however, that the number of required buffers increases with the number of virtual channels. Accordingly, it is desirable to reduce the number of virtual channels by combining various packet types which do not conflict in a logical/protocol fashion. While such packets may physically conflict with each other when travelling in the same virtual channel, their lack of logical conflict allows for the resource conflict to be resolved without deadlock. Similarly, keeping packets which may logically conflict with each other in separate virtual channels provides for no resource conflict between the packets. Accordingly, the logical conflict may be resolved through the lack of resource conflict between the packets by allowing the packet which is to be completed first to make progress.

In one embodiment, packets travelling within a particular virtual channel on the coherent link from a particular source node to a particular destination node remain in order. However, packets from the particular source node to the particular destination node which travel in different virtual channels are not ordered. Similarly, packets from the particular source node to different destination nodes, or from different source nodes to the same destination node, are not ordered (even if travelling in the same virtual channel).

Packets travelling in different virtual channels may be routed through computer system 10 differently. For example, packets travelling in a first virtual channel from processing node 16A to processing node 16C may pass through processing node 16B, while packets travelling in a second virtual channel from processing node 16A to processing node 16C may pass through processing node 16D. Each node may include circuitry to ensure that packets in different virtual channels do not physically conflict with each other.

A given write operation may be a "posted" write operation or a "non-posted" write operation. Generally speaking, a posted write operation is considered complete by the source node when the write command and corresponding data are transmitted by the source node (e.g., by an interface within the source node). A posted write operation is thus in effect completed at the source. As a result, the source node may continue with other operations while the packet or packets of the posted write operation travel to the target node and the target node completes the posted write operation. The source node is not directly aware of when the posted write operation is actually completed by the target node. It is noted that certain deadlock conditions may occur in Peripheral Component Interconnect (PCI) I/O systems if posted write operations are not allowed to become unordered with respect to other memory operations.

In contrast, a non-posted write operation is not considered complete by the source node until the target node has completed the non-posted write operation. The target node generally transmits an acknowledgement to the source node when the non-posted write operation is completed. It is noted that such acknowledgements consume interconnect bandwidth and must be received and accounted for by the source node. Non-posted write operations may be required when the write operations must be performed in a particular order (i.e., serialized).

A non-posted WrSized command belongs to the NPC virtual channel, and a posted WrSized command belongs to the PC virtual channel. In one embodiment, bit 5 of the command field Cmd[5:6] is used to distinguish posted writes and non-posted writes. Other embodiments may use a different field to specify posted vs. non-posted writes. It is noted that info packets are used to communicate between adjacent nodes, and hence may not be assigned to virtual channels in the present embodiment.

Non-Coherent Packets Within I/O Subsystem 14

FIG. 8 is a diagram of an exemplary non-coherent command packet 50 which may be employed within I/O subsystem 14. Command packet 50 includes command field Cmd[5:0] similar to command field Cmd[5:0] of the coherent packet. Additionally, an optional source tag field SrcTag [4:0], similar to the source tag field SrcTag[4:0] of the coherent command packet, may be transmitted in bit time 3. The address may be transmitted in bit times 5–8 (and optionally in bit time 4 for the least significant address bits).

A unit ID field UnitID[4:0] replaces the source node field SrcNode[4:0] of the coherent command packet. Unit IDs serve to identify packets as coming from the same logical source (if the unit IDs are equal). However, an I/O node may have multiple unit IDs (for example, if the node includes multiple devices or functions which are logically separate). Accordingly, a node may accept packets having more than one unit ID.

Additionally, since packets flow between host bridge 28 and I/O nodes 24A–24C, the fact that host bridge 28 is either the source or destination of each packet may be implied within the non-coherent packets. Accordingly, a single unit ID may be used in the non-coherent packets. In one embodiment, the unit ID may comprise 5 bits. Unit ID "00000"(0) may be assigned to the host bridge, and unit ID "11111"(31) may be used for error cases. Accordingly, up to 30 unit IDs may exist Within I/O subsystem 14.

Additionally, command packet 50 includes a sequence ID field SeqID[3:0] transmitted in bit times 1 and 2. The sequence ID field SeqID[3:0] may be used to group a set of two or more command packets from the same unit ID and indicate that the set is ordered. A sequence ID field SeqID [3:0] value of zero may be used to indicate that the packet is unordered. A non-zero value within the sequence ID field SeqID[3:0] may be used to indicate the ordering of the packet with respect to other packets of the same transaction.

Command packet 50 also includes a pass posted write PassPW bit transmitted in bit time 2. The Pass PW bit determines whether command packet 50 is allowed to pass posted writes from the same unit ID. If the pass posted write bit is zero or clear, the packet is not allowed to pass a prior posted write. If the pass posted write bit is one or set, the packet is allowed to pass prior posted writes. For read packets, the command field Cmd[5:0] includes a bit (e.g. bit 3) which is defined as the "responses may pass posted writes" bit. That bit becomes the PassPW bit in the response packet corresponding to the read.

FIG. 9 is a diagram of an exemplary non-coherent response packet 52 which may be employed within I/O subsystem 14. Response packet 52 includes the command field Cmd[5:0], the unit ID field UnitID[4:0], the source tag field SrcTag[4:0], and the PassPW bit similar to command packet 50 described above. Other bits may be included in response packet 52 as needed.

FIG. 10 is a table 54 listing different types of non-coherent command packets which may be employed within I/O subsystem 14. Other embodiments of I/O subsystem 14 are possible and contemplated, and may include other suitable sets of packets and command field encodings. Table 54 includes a command (CMD) code column listing contents of command field Cmd[5:0] for each non-coherent command, a virtual channel (Vchan) column defining the virtual channel to which the non-coherent packets belong, a command column naming the command, and a packet type column indicating which of command packets 40, 50, and 52 is employed for that command.

The Nop, WrSized, ReadSized, RdResponse, TgtDone, Broadcast, and Sync packets may be similar to the corresponding coherent packets described with respect to, FIG. 7. However, within I/O system 14, neither probe command nor probe response packets are issued. Posted/non-posted write operations may again be identified by the value of bit 5 of the WrSized command, as described above, and TgtDone response packets may not be issued for posted writes.

A Flush command may be issued by an I/O node 24 to ensure that one or more previously performed posted write commands have completed on the target interface. Generally, since posted commands are completed (e.g. receive the corresponding TgtDone response) on the source node interface prior to completing the command on the target node interface, the source node cannot determine when the posted commands have been flushed to their destination within the target node interface. Executing a Flush command (and receiving the corresponding TgtDone response packet) provides a means for the source node to determine that previous posted commands have been flushed to their destinations.

Assign and assign acknowledge (AssignAck) packets are used to assign Unit IDs to I/O nodes 24. Host bridge 28 transmits an Assign command packet to each I/O node 24 in sequence, the Assign command packet indicating the last used Unit ID. The receiving I/O node 24 assigns the number of Unit IDs required by that node, starting at the last used Unit ID+1. The receiving I/O node returns the AssignAck packet, including an ID count indicating the number of Unit IDs assigned.

Packet Ordering Rules Within I/O Subsystem 14

As described above, non-coherent packets transmitted within I/O subsystem 14 are either transmitted in an upstream direction toward host bridge 28 or in a downstream direction away from host bridge 28, and may pass through one or more intermediate I/O nodes 24. Host bridge 28 receives non-coherent memory command packets form I/O subsystem 14, translates the non-coherent command packets to corresponding coherent command packets, and issues the coherent memory command packets within processing subsystem 12. Certain memory operations must be completed in the order in which they were generated (i.e., in chronological order) in order to preserve memory coherency within computer system 10 and to adhere to certain I/O ordering requirements expected by I/O devices. For example, PCI I/O systems may define certain ordering requirements to assure deadlock-free operation. Accordingly, each processing node 16 and I/O node 24 implements ordering rules with regard to memory operations in order to preserve memory coherency within computer system 10 and to and to adhere to I/O ordering requirements.

FIG. 11 is a table 56 listing ordering rules which may be implemented regarding packets traveling in the different virtual channels of I/O subsystem 14. As shown in FIG. 10, sized read commands, non-posted sized write command and data packets, and Flush command packets travel in the non-posted command (NPC) virtual channel. Posted sized write command and data packets and broadcast commands travel in the posted command (PC) virtual channel, and response packets travel in the response (R) virtual channel.

Host bridge 28 is the destination of packets traveling upstream within I/O subsystem 14, and unit ID field UnitID [4:0] of packets traveling upstream contain the unit ID of the source I/O node 24. In one embodiment, packets having the same unit ID are assumed to be part of the same "I/O stream". Generally, an "I/O stream" is a group of packets, and I/O streams are treated as being independent within computer system 10. On the other hand, while the unit ID field UnitID[4:0] of response packets traveling downstream contain the unit ID of the target I/O node 24, the unit ID field UnitID[4:0] of command packets traveling downstream contain the unit ID of host bridge 28 (e.g., "00000"). Therefore, all packets traveling downstream may be assumed to be in the same I/O stream.

I/O nodes 24 within I/O subsystem 14 implement the following upstream ordering rules regarding packets in the non-posted command (NPC) channel, the posted command (PC) channel, and the response (R) channel:

1) Packets from different source I/O nodes are in different I/O streams and are not ordered with respect to one another,
2) Packets in the same I/O stream that are part of a sequence are strongly ordered, and may not pass each other, and
3) Packets from the same source I/O node, but not part of a sequence, may be forwarded ahead of (i.e., pass) other packets according to table 56 in FIG. 11.

In table 56 of FIG. 11, a "No" entry indicates a subsequently issued command/response packet listed in the corresponding row of table 56 is not allowed to pass a previously issued command/response packet listed in the corresponding column of table 56. For example, command and/or data packets of a subsequently issued non-posted write transaction are not allowed to pass command an/or data packets of a previously issued posted write transaction if the PassPW bit is clear (e.g., a "0") in the command and/or data packets of the subsequently issued non-posted write command transaction. Such "blocking" of subsequently issued commands may be required in order to preserve memory coherency within computer system 10. It is noted that allowing packets traveling in one virtual channel to block packets traveling in a different virtual channel represents a necessary interaction between the otherwise independent virtual channels within I/O subsystem 14.

A "Yes" entry in table 56 indicates a subsequently issued command/response packet listed in the corresponding row of table 56 is allowed to pass a previously issued command/response packet listed in the corresponding column of table 56. For example, command and/or-data packets of a subsequently issued posted write transaction may pass command and/or data packets of a previously issued non-posted write transaction. Such passing may actually be required to prevent a deadlock situation within computer system 10.

An "X" entry in table 56 indicates that there are no ordering requirements between a subsequently issued command/response packet listed in the corresponding row of table 56 and a previously issued command/response packet listed in the corresponding column; of table 56. For example, there are no ordering requirements between command and/or data packets of a subsequently issued non-posted write transaction and command and/or data packets of a previously issued non-posted write transaction. The command and/or data packets of the subsequently issued non-posted write transaction may be allowed to pass the command and/or data packets of the previously issued non-posted write transaction if there is any advantage to doing so.

I/O Transaction Ordering Rules Within Processing Subsystem 12

As described above, host bridge 28 within processing node 16C translates packets moving between processing subsystem 12 and I/O subsystem 14. FIG. 12 is a table 58 listing ordering rules which may be implemented by host bridge 28 regarding transactions originating within I/O subsystem. 14 and entering processing subsystem 12. Each row in table 58 includes a first I/O request "Request$_1$" of an ordered pair of requests (i.e., operations, commands, transactions, etc.), the second I/O request "Request$_2$" received after Request$_1$, and the wait requirements of Request$_2$ with respect to Request$_1$. Regarding the wait requirements: (i) a packet "$X_n$" (e.g., "TgtDone$_1$") is a coherent packet unless otherwise noted, and (ii) if a first packet "$X_2$" must wait for a second packet "$Y_1$", the "X" packet in the second transaction may not be issued until the "Y" packet in the first transaction is received by host bridge 28.

The entries of table 58 of FIG. 12 ensure the I/O ordering rules listed in table 56 of FIG. 11 are met despite the fact that packets of transactions originating within I/O subsystem 14 and entering processing subsystem 12 have no defined ordering relationship with respect to each other within processing subsystem 12. In general, I/O subsystem 14 provides a first transaction Request$_1$ and a second transaction Request$_2$ to host bridge 28, wherein the Request$_2$ follows Request$_1$. Host bridge 28 dispatches Request$_1$ within processing subsystem 12. Host bridge 28 may dispatch Request$_2$ within processing subsystem 12 dependent upon progress of Request$_1$ within processing subsystem 12. Alternately, host bridge 28 may delay completion of Request$_2$ with respect to Request$_1$.

Figure 13:
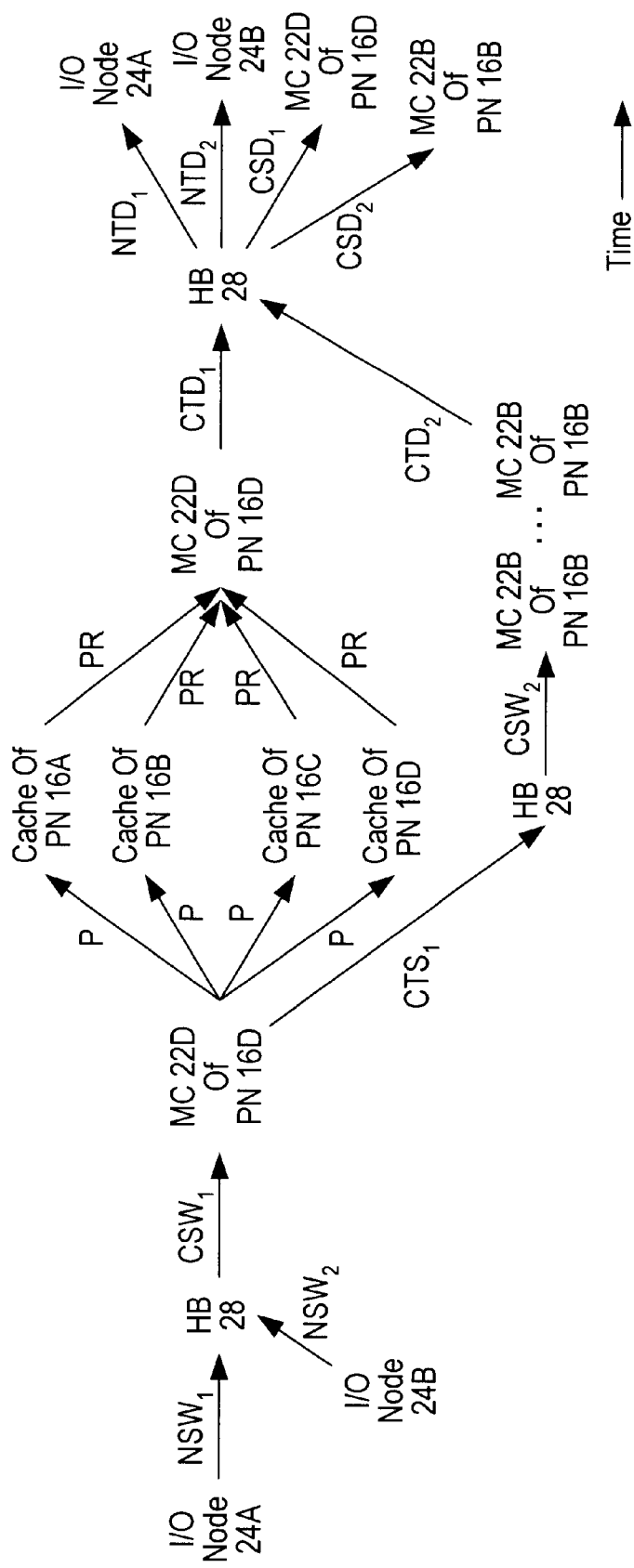
FIG. 13 is a diagram illustrating the events associated with an exemplary ordered pair of write transactions as a function of time, wherein the write transactions originate within the I/O subsystem and enter the processing subsystem.

FIG. 13 will now be used to describe the situation wherein host bridge 28 dispatches a first received I/O transaction Request$_1$ within processing subsystem 12, and dispatches a second received I/O transaction Request$_2$ within processing subsystem 12 dependent upon progress of Request$_1$ within processing subsystem 12. In the first row of table 58 of FIG. 12, I/O subsystem 14 provides a first memory write transaction (Request$_1$) and a second memory write transaction (Request$_2$) to host bridge 28, wherein the second transaction follows the first transaction. FIG. 13 is a diagram illustrating the events associated with an exemplary ordered pair of write transactions as a function of time. A first write transaction of the ordered pair is generated by I/O node 24A and includes data to be stored within memory 20D coupled to processing node 16D. The second write transaction of the ordered pair is generated by I/O node 24B and includes data to be stored within memory 20B coupled to processing node 16B. Both the first and second write transactions are directed to host bridge 28 within processing node 16C. The first write transaction is generated before second write transaction, and is received by host bridge 28 before the second write transaction. The first and second write transactions may be posted write transactions or non-posted write transactions. In this example, it will be assumed that processing nodes 16A–16D include caches similar to cache 38 as described above.

I/O node 24A produces the first write transaction as a non-coherent sized write transaction NSW$_1$, and I/O node 24B produces the second write transaction as a non-coherent sized write transaction $NSW_2$. Each write transaction includes a non-coherent sized write command packet followed by a data packet. FIG. 14 is a diagram of an exemplary non-coherent sized write command packet format.

The non-coherent sized write command packet of FIG. 14 includes the command field Cmd[5:0], the unit ID field UnitID[4:0], the sequence ID field SeqlD[3:0], the PassPW bit, the source tag field SrcTag[4:0] and the address field Addr[39:2] described above. Command field Cmd[5:0] contents of x01xxx may identify the command as a write command. Bit [5] of Cmd[5:0] may determine if the write command is posted or non-posted. For example, when Cmd[5:0] contains 001xxx, the command packet may be a non-posted write command packet, and when Cmd[5:0] contains 101xxx, the command packet may be a posted write command packet. The unit ID field UnitID[4:0] identifies the source I/O node, and Addr[39:2] identifies the memory address accessed by the write transaction.

The non-coherent sized write command packet of FIG. 14 also includes a mask/count field Mask/Count[3:0] and a compatibility bit Compat. The mask/count field Mask/Count [3:0] either indicates which bytes within a data unit (e.g., 32-bit doubleword) are to be read (mask), or encodes the number of data units to be transferred (count). The compatibility bit Compat is a routing bit used with legacy hardware.

I/O node 24A transmits the packets of the first write transaction upstream to processing node 16C via non-coherent communication link 26A. Interface 32 of processing node 16C receives the packets of the first write transaction and provides the information contained within the packets of the first write transaction to packet processing logic 34. Host bridge 28 within packet processing logic 34 uses the address of the memory location and the memory map described above to determine that processing node 16D is the target. Host bridge 28 translates $NSW_1$ to a first coherent sized write transaction $CSW_1$, wherein $CSW_1$ identifies processing node 16D as the target. In doing so, host bridge 28 translates the non-coherent command packet of $NSW_1$ to a coherent command packet of $CSW_1$. If necessary, host bridge 28 may also translate the non-coherent data packets of $NSW_1$ to coherent data packets of $CSW_1$.

FIG. 15 is a diagram of an exemplary coherent sized write command packet format. The coherent sized write command packet of FIG. 15 includes the command field Cmd[5:0], the destination node field DestNode[2:0], the destination unit field DestUnit[1:0], the source node field SrcNode[2:0], the source unit field SrcUnit[1:0], the source tag field SrcTag [4:0], the address field Addr[39:2], the mask/count field Mask/Count[3:0], and the compatibility bit Compat described above.

Host bridge 28 generates the $CSW_1$ command packet with the contents of DestNode[2:0] identifying processing node 16D as the target (e.g., a NodeID of processing node 16D), the contents of SrcNode[2:0] identifying processing node 16C as the source of $CSW_1$ (e.g., a NodeD of processing node 16C), and the contents of SrcTag[4:0] being a source tag of processing node 16C.

Figure 16:
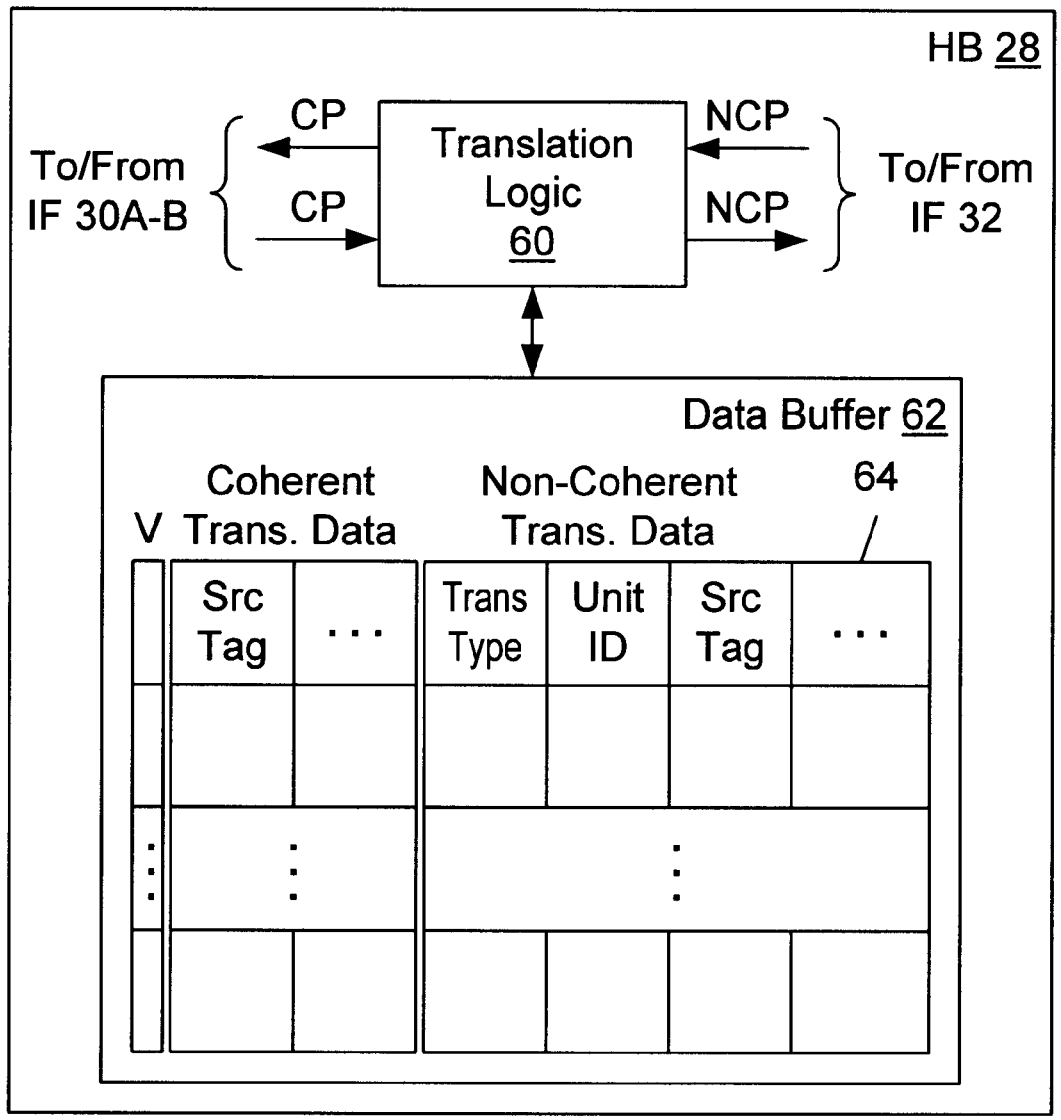
FIG. 16 is a diagram of one embodiment of the host bridge of FIGS. 1 and 2, wherein the host bridge includes translation logic coupled to a data buffer.

FIG. 16 is a diagram of one embodiment of host bridge 28 of FIGS. 1 and 2. In the embodiment of FIG. 16, host bridge 28 includes translation logic 60 coupled to a data buffer 62. Translation logic 60 translates non-coherent packets (NCPs), sourced within I/O subsystem 14 and having a target within processing subsystem 12, to corresponding coherent packets (CPs). Translation logic 60 also translates coherent packets, sourced within processing subsystem 12 and having a target within I/O subsystem 14, to corresponding non-coherent packets. Translation logic 60 may store coherent and/or non-coherent data associated with transactions sourced in one subsystem and having a target in the other subsystem within data buffer 62.

Data buffer 62 may store the transaction data in the form of a table 64 having multiple entries. Each entry may include a valid bit V, a SOURCE TAG field in a portion of table 64 associated with coherent transaction data, and a TRANSACTION TYPE, UNIT ID, and SOURCE TAG fields in a portion of table 64 associated with non-coherent transaction data. Valid bit V may indicate whether the corresponding entry is valid. For example, valid bit V may have a value of "1" if the corresponding entry is valid, and may have a value of "0" if the corresponding entry is invalid. The SOURCE TAG field in the portion of table 64 associated with coherent transaction data may be used to store a source tag of processing node 16C assigned to the coherent transaction by host bridge 28. The TRANSACTION TYPE field may contain a value indicating the type of transaction. The UNIT ID field may contain a value identifying an I/O node source of the transaction. The SOURCE TAG field in the portion of table 64 associated with non-coherent transaction data may be used to store a source tag of processing node 16C assigned to the non-coherent transaction by a source I/O node. As indicated in FIG. 3, other information may be stored within table 64.

Translation logic 60 translates the $NSW_1$ command packet to the $CSW_1$ command packet identifying processing node 16D as the target. Translation logic 60 may also translate the non-coherent data packets of $NSW_1$ to coherent data packets of $CSW_1$.

Translation logic 60 stores coherent and non-coherent data associated with the first write transaction within data buffer 62. Translation logic 60 may use the contents of Cmd[5:0] to determine the type of transaction, and may assign a corresponding value to a TRANSACTION TYPE identifier. It is noted that translation logic 60 distinguishes between posted and non-posted first write transactions, and assigns different values to the TRANSACTION TYPE identifier in each case. Translation logic 60 may provide the contents of SrcTag[4:0] of the non-first coherent sized write transaction $CSW_1$, the contents of SrcTag[4:0]assigned by host bridge 28 to $CSW_1$, and the TRANSACTION TYPE identifier and the contents of the unit ID field UnitID[4:0] of the non-coherent write command packet to data buffer 62. Data buffer 44 may store the contents of SrcTag[4:0] of $CSW_1$ within the SOURCE TAG field of the coherent transaction data portion of an available (e.g., invalid) entry within table 64. Data buffer 44 may store the value of the TRANSACTION TYPE identifier within the TRANSACTION TYPE field of the entry, and the contents of the unit ID field UnitID[4:0] within the UNIT ID field of the entry. Data buffer 44 may also store the contents of SrcTag[4:0] of the first non-coherent sized write transaction $CSW_1$ within the SOURCE TAG field of the non-coherent transaction data portion of the entry. Data buffer 44 may also set valid bit V of the entry to "1" to indicate that the entry is valid.

Translation logic 60 translates the $NSW_2$ command packet to a command packet of a second coherent sized write transaction $CSW_2$, wherein the command packet of $CSW_2$ identifies processing node 16B as the target. Translation logic 60 may also translate the non-coherent data packets of $NSW_2$ to coherent data packets of $CSW_2$. Translation logic 60 stores coherent and non-coherent data associated with the second write transaction within data buffer 62 as described above. Host bridge 28 delays providing the packets of $CSW_2$ to packet processing logic 34 for issuance until a first coherent target start (CTS₁) response packet is received from the target of CSW₁.

Referring back to FIG. 13 in conjunction with FIG. 2, host bridge 28 provides the packets of CSW₁ (i.e., the first coherent sized write command packet and the one or more coherent data packets) to packet processing logic 34 for issuance. Packet processing logic 34 provides the packets of CSW₁ to interface 30B. Interface 30B transmits the packets of the first write transaction to processing node 16D via communication link 18C. The packet processing logic of processing node 16D uses the contents of the destination node field DestNode[2:0] and the destination unit field DestUnit[1:0] to determine that memory controller 22D is to receive the first write transaction, and provides the information contained within the packets of the first write transaction to memory controller 22D.

Memory controller 22D broadcasts probe command packets (P) to all processing nodes 16A–16D of processing subsystem 12. Memory controller 22D properly orders CSW₁ with respect to other pending operations within memory controller 22D, and signals host bridge 28 that CSW₁ is properly ordered (i.e., serialized) with respect to other pending operations within the target via the CTS₁ response packet.

The first row in Table 58 of FIG. 12 is directed to an ordered pair of write transactions originating within I/O subsystem 14 and entering processing subsystem 12. There are three wait requirements associated with the ordered pair of write transactions. The first wait requirement states "Cmd₂ must wait for TgtStart₁." In this example, the second coherent sized write transaction CSW₂ must wait for the first coherent target start CTS₁ response packet.

Upon receiving the CTS₁ response packet, host bridge 28 provides the packets of CSW₂ (i.e., the second coherent sized write command packet and the one or more coherent data packets) to packet processing logic 34 for issuance. Packet processing logic 34 provides the packets of CSW₂ to interface 30B. Interface 30B transmits the packets of the second write transaction to processing node 1.6B via communication link 18B. The packet processing logic of processing node 16B uses the contents of the destination node field DestNode[2:0] and the destination unit field DestUnit[1:0] to determine that memory controller 22B is to receive the second write transaction, and provides the information contained within the packets of the second write transaction to memory controller 22B.

Upon receiving a probe command packet, the packet processing logic within each processing node directs the probe command information to the cache within the processing node. If a cache receiving a probe command includes data associated with the address information of the probe command, but the data has not been modified, the cache invalidates the data and returns a probe response (PR) packet. On the other hand, if the cache includes modified data associated with the address information of the probe command, the cache returns the modified data via a read response transaction. The read response transaction includes a read response packet followed by a data packet including the modified data.

FIG. 17 is a diagram of one embodiment of a probe command packet. The probe command packet of FIG. 17 includes the source node field SrcNode[2:0], the source unit field SrcUnit[1:0], the command field Cmd[5:0], the source tag field SrcTag[4:0], and the address field Addr[39:3] described above, along with a target node field TgtNode[2:0] and a target unit field TgtUnit[1:0]. The source unit field SrcUnit[1:0] contains a value identifying memory controller 22D as the source unit issuing the probe command. The command field Cmd[5:0] contains a value which identifies the packet as a probe command. The target node field TgtNode[2:0] contains a value identifying processing node 16D (e.g., the NodeID of processing node 16D) as the target for probe responses. The target unit field TgtUnit[1:0] contains a value identifying memory controller 22D as the target unit for probe responses. The contents of SrcTag[4:0] is a source tag of processing node 16D assigned by processing node 16D to the probe command. Addr[39:3] identifies the address accessed by the write command.

The probe command packet of FIG. 17 also includes a memory data bit MD, a field reserved for future use Rsv, a next state field NextState[1:0], and a return data bit RD. The memory data bit MD indicates whether a read data response is required. The next state field NextState[1:0] indicates a cache state transition which should occur if the addressed data exists within the cache. The read data bit RD indicates whether data movement is required.

FIG. 18 is a diagram of one embodiment of a probe response packet. The probe response packet of FIG. 18 includes the source node field SrcNode[2:0], the source unit field SrcUnit[1:0], the command field Cmd[5:0], the destination node field DestNode[2:0], the destination unit field DestUnit[1:0], and the source tag field SrcTag[4:0] described above. The source node field SrcNode[2:0] contains a value identifying the processing node as the source node issuing the probe response, and the source unit field SrcUnit[1:0] contains a value identifying the source unit within the source node issuing the probe response. The command field Cmd[5:0] contains a value which identifies the packet as a probe response. The destination node field DestNode[2:0] contains a value identifying processing node 16D (e.g., the NodeID of processing node 16D) as the destination of the probe response packet. The destination unit field DestUnit[1:0] contains a value identifying memory controller 22D as the destination unit of the probe response. The contents of SrcTag[4:0] is a source tag of the processing node issuing the probe response.

The probe response packet of FIG. 18 also includes several fields reserved for future use Rsv, an error bit Error, and a shared bit Shared. The error bit Error indicates whether the probe command resulted in an error. The shared bit Shared indicates whether the target node is maintaining a copy of the addressed data.

Returning to FIG. 13, memory controller 22D receives a probe response (PR) from each processing node 16A–16D. If one or more of the probe responses are read responses, memory controller 22D merges the write data of CSW₁ with the data of the read responses. At this point, CSW₁ is properly ordered within memory controller 22D with respect to other pending operations within memory controller 22D, and a correct coherency state with respect to CSW₁ has been established within the other processing nodes 16A–16C. The first coherent sized write transaction CSW₁ has reached a "point of coherency" within processing subsystem 12, and memory controller 22D transmits a first coherent target done (CTD₁) response packet to host bridge 28.

FIG. 19 is a diagram of one embodiment of a coherent target done response packet. The coherent target done response packet of FIG. 19 includes the source node field SrcNode[2:0], the source unit field SrcUnit[1:0], the command field Cmd[5:0], the destination node field DestNode[2:0], the destination unit field DestUnit[1:0], and the source tag field SrcTag[4:0] described above. The source node field SrcNode[2:0] contains a value identifying a particular processing node as the source node issuing the coherent target done response. The source unit field SrcUnit[1:0] contains a value identifying a particular unit (e.g., memory controller) within the source node as the source unit issuing the coherent target done response.

The command field Cmd[5:0] contains a value which identifies the packet as a coherent target done response. The destination node field DestNode[2:0] contains a value identifying processing node 16C (e.g., the NodeID of processing node 16C) as the destination of the coherent target done response packet. The destination unit field DestUnit[1:0] contains a value identifying host bridge 28 as the destination unit of the coherent target done response. The contents of SrcTag[4:0] is the source tag originally assigned to the write operation by host bridge 28 (i.e., the source tag of the original coherent sized write command packet generated by host bridge 28). The coherent target done response packet of FIG. 19 includes several fields reserved for future use Rsv and an error bit Error which indicates whether the preceding probe command resulted in an error.

Returning to FIG. 13, it is noted that when memory controller 22D transmits the $CTD_1$ response packet to host bridge 28, $CSW_1$ has at least reached the point of coherency within processing subsystem 12, and $CSW_1$ may or may not have been actually completed. In other words, when memory controller 22D transmits the coherent target done response packet, $CSW_1$ has been properly ordered with respect to other pending operations, and a correct coherency state with respect to $CSW_1$ has been established in the other processing nodes. However, memory controller 22D may or may not have actually stored the data associated with $CSW_1$ within memory 20D.

With regard to $CSW_2$, memory controller 22B broadcasts probe command packets (P) to all processing nodes 16A–16D of processing subsystem 12. Memory controller 22B may properly order $CSW_2$ with respect to other pending operations within memory controller 22B, and signal host bridge 28 that $CSW_2$ is properly ordered (i.e., serialized). with respect to other pending operations within the target via a second coherent target start ($CTS_2$) response packet. Memory controller 22B receives a probe response (PR) from each processing node 16A–16D. If one or more of the probe responses are read responses, memory controller 22B merges the write data of $CSW_2$ with the data of the read responses. At this point, memory controller 22B has properly ordered $CSW_2$ with respect to other pending operations within memory controller 22B, and a correct coherency state with respect to $CSW_2$ has been established within the other processing nodes 16A–16C. The second coherent sized write transaction $CSW_2$ has reached a "point of coherency" within processing subsystem 12, and memory controller 22D transmits a second coherent target done ($CTD_2$) response packet to host bridge 28.

Processing node 16D transmits the $CTS_1$ packet to processing logic 34 of processing node 16C via communication link 18C and interface 30B. Translation logic 60 of host bridge 28 provides the contents of the source tag field SrcTag[4:0] of the target done response packet to data buffer 62. Data buffer 62 searches table 64 for a corresponding entry having a SOURCE TAG field within the coherent transaction data portion and containing a value which matches the contents of the source tag field SrcTag[4:0]. When data buffer 62 locates the corresponding entry within table 64, data buffer 62 may provide data from the non-coherent transaction data portion of the corresponding entry to translation logic 60, then invalidate the corresponding entry (e.g., by setting the valid bit V of the corresponding entry to "0").

Host bridge 28 issues a first coherent source done ($CSD_1$) response packet to memory controller 22D. Host bridge 28 may release any buffers involved with the first write transaction upon issuing the $CSD_1$ response packet. Memory controller 22D may release any buffers involved with the first write transaction upon receiving the $CSD_1$ response packet. Similarly, host bridge 28 issues a second coherent source done ($CSD_2$) response packet to memory controller 22B. Host bridge 28 may release any buffers involved with the second write transaction upon issuing the $CSD_2$ response packet. Memory controller 22B may release any buffers involved with the second write transaction upon receiving the $CSD_2$ response packet.

The second wait requirement in the first row in Table 58 of FIG. 12 states "$SrcDone_2$ must wait for $TgtDone_1$." In this example, the second coherent source done $CSD_2$ response packet must wait for the first coherent target done $CTD_1$ response packet. The third wait requirement in the first row in Table 58 of FIG. 12 states "TgtDone2 on the non-coherent link (if required) must wait for TgtDone1." In this example, a second non-coherent target done $NTD_2$ response packet must wait for $CTD_1$.

If host bridge 28 receives the $CTD_1$ response packet before the $CTD_2$ response packet, host bridge 28 responds to the $CTD_1$ response packet by issuing the first coherent source done $CSD_1$ response packet to memory controller 22D. If the first write transaction is a non-posted write transaction, host bridge 28 also responds to the $CTD_1$ response packet by issuing a first non-coherent target done ($NTD_1$) response packet directed to I/O node 24A. When the $CTD_2$ response packet is later received, host bridge 28 responds to the $CTD_2$ response packet by issuing the second coherent source done $CSD_2$ response packet to memory controller 22B. If the second write transaction is a non-posted write transaction, host bridge 28 also responds to the $CTD_2$ response packet by issuing the second non-coherent target done ($NTD_2$) response packet directed to I/O node 24B.

On the other hand, if host bridge 28 receives the $CTD_2$ response packet before the $CTD_1$ response packet, host bridge 28 delays issuing the $CSD_2$ response packet until the $CTD_1$ response packet is received. If the second write transaction is a non-posted write transaction, host bridge 28 also delays issuing the $NTD_2$ response packet until the $CTD_1$ response packet is received. Host bridge 28 responds to the later receives the $CTD_1$ response packet by issuing the $CSD_1$ response packet to memory controller 22D. If the first write transaction is a non-posted write transaction, host bridge 28 also responds to the $CTD_1$ response packet by issuing the $NTD_1$ response packet to I/O node 24A. Host bridge 28 responds to the received $CTD_1$ and $CTD_2$ response packets by issuing the $CSD_2$ response packet to-memory controller 22B. If the second write transaction is a non-posted write transaction, host bridge 28 responds to the received $CTD_1$ and $CTD_2$ response packets by issuing the $NTD_2$ response packet to I/O node 24B.

Host bridge 28 may generate the non-coherent target done response packets, or may translate the coherent target done response packets received from the processing nodes to form the non-coherent target done response packets. FIG. 20 is a diagram of one embodiment of a non-coherent target done response packet. The non-coherent target done response packet of FIG. 20 includes the command field Cmd[5:0], the unit ID field UnitID[4:0], the PassPW bit, the error bit Error, and the source tag field SrcTag[4:0] described above. The command field Cmd[5:0] contains a value which identifies the packet as a non-coherent target done response. The unit ID field UnitID[4:0] is the value of the UNIT ID field obtained from the non-coherent transaction data portion of the corresponding entry within table 64. The coherent target done response packet of FIG. 20 also includes a bridge bit Bridge and several fields reserved for future use Rsv. The value of the bridge bit Bridge indicates whether the response packet was transmitted by host bridge 28, and is used to distinguish responses travelling upstream from responses traveling downstream. In this case, the value bridge bit Bridge indicates that the response packet was transmitted by host bridge 28.

FIG. 21 is a diagram of one embodiment of a coherent source done response packet. The coherent source done response packet of FIG. 21 includes the source node field SrcNode[2:0], the source unit field SrcUnit[1:0], the command field Cmd[5:0], the destination node field DestNode[2:0], the destination unit field DestUnit[1:0], and the source tag field SrcTag[4:0] described above. The source node field SrcNode[2:0] contains a value identifying processing node 16C as the source node issuing the coherent source done response. The source unit field SrcUnit[1:0] contains a value identifying host bridge 28 as the source unit issuing the coherent source done response. The command field Cmd[5:0] contains a value which identifies the packet as a coherent source done response. The destination node field DestNode[2:0] contains a value identifying a processing node as the destination of the coherent source done response packet. The destination unit field DestUnit[1:0] contains a value identifying a unit (e.g., a memory controller) as the destination unit of the coherent source done response. The contents of SrcTag[4:0] is a source tag assigned by processing node 16C. The coherent source done response packet of FIG. 21 also includes several fields reserved for future use Rsv and, an error bit Error which indicates whether an error is associated with the transaction, and a Cancel bit used when the source done response packet is issued in response to a read transaction.

Returning to FIG. 13, it is noted that TgtStart response packets such as $CTS_1$ are optional within computer system 10. Thus reception of any other response packet (e.g., a TgtDone or RdResponse response packet) from a target by host bridge 28 may serve to satisfy the wait requirement for the TgtStart response packet. For example, the first wait requirement in the first row of table 58 of FIG. 12 states: "$Cmd_2$ must wait for $TgtStart_1$." Should host bridge 28 receive the first coherent target done $CTD_1$ response packet from memory controller 22D before the first coherent target start response packet $CTS_1$, host bridge 28 assumes that $CTS_1$ will not be forthcoming, and issues the second coherent sized write transaction $CSW_2$. Thus the reception of $CTD_1$ satisfies the wait requirement for the TgtStart response packet $CTS_1$.

Figures 22, 23:
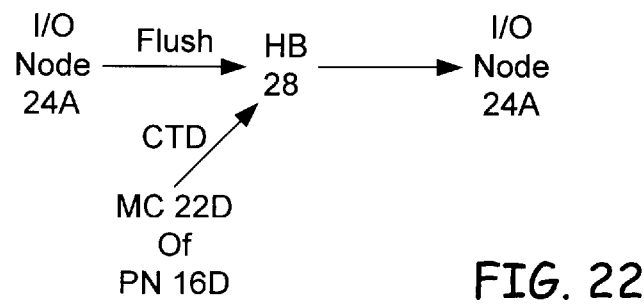
FIG. 22 is a diagram illustrating the events associated with an exemplary posted write transaction followed by a Flush command as a function of time.
FIG. 23 is a diagram of one embodiment of a non-coherent Flush command packet.

FIGS. 22 and 23 will now be used to describe the situation wherein host bridge 28 dispatches a first received I/O transaction $Request_1$ within processing subsystem 12, and delays completion of a second received I/O transaction $Request_2$ with respect to $Request_1$. In the sixth row of table 58 of FIG. 12, I/O subsystem 14 provides a memory write. transaction ($Request_1$) and a Flush command ($Request_2$) to host bridge 28, wherein the Flush command follows the memory write transaction. FIG. 22 is a diagram illustrating the events associated with an exemplary posted write transaction followed by a Flush command as a function of time. The posted write transaction is generated by I/O node 24A and includes data to be stored within memory 20D coupled to processing node 16D. The Flush command is generated by I/O node 24A subsequent to the posted write transaction, and is received by host bridge 28 after the write transaction. In this example, it will be assumed that processing nodes 16A–16D include caches similar to cache 38 as described above.

An I/O node 24 of I/O subsystem 14 (e.g., I/O node 24A) may issue one or more posted write commands in order to garner the performance advantage associated with posted write operations over non-posted write operations. Subsequently, the I/O node may transmit a Flush command. A transaction done response received by the I/O node in response to the Flush command signifies that all of the posted write operations previously issued by the I/O node have reached points of coherency with respect to other pending operations such that memory coherency is preserved within computer system 10.

FIG. 23 is a diagram of one embodiment of a non-coherent Flush command. packet. The non-coherent Flush command packet of FIG. 23 includes the command field Cmd[5:0], the PassPW bit, the unit ID field UnitID[4:0], and the source tag field SrcTag[4:0] described above. The command field Cmd[5:0] contains a value which identifies the packet as a Flush command. Flush command packets are transmitted in the non-posted command (NPC) virtual channel, and certain other command packets including posted write command packets are transmitted in the posted command (PC). virtual channel. The PassPW bit is set to a value (e.g., "0") which indicates that command packets in the posted command virtual channel and received ahead of the Flush command packet must be acted upon ahead of the Flush command. The unit ID field UnitID[4:0] contains a value associated with the source I/O node 24A (e.g., the UnitID of the source I/O node 24A). The source tag field SrcTag[4:0] is a transaction tag assigned by the source I/O node 24A. The non-coherent Flush command packet of FIG. 11 also includes a sequence Id field SeqID[3:0] defined above and several fields reserved for future use Rsv.

As indicated in FIG. 22, I/O node 24A transmits a non-coherent Flush command packet to host bridge 28 as described above. The unit ID field UnitID[4:0] of the non-coherent Flush command packet contains a value associated with source I/O node 24A (e.g., the UnitID of I/O node 24A). Translation logic 60 of host bridge 28 provides the contents of the unit ID field UnitID[4:0] of the non-coherent Flush command packet to data buffer 62. Data buffer 62 searches valid entries of table 64 for a UNIT ID field containing a value which matches the contents of the unit ID field UnitID[4:0].

For clarity, valid entries of table 64 having a UNIT ID field containing a value which matches the contents of the unit ID field UnitID[4:0] of the non-coherent Flush command packet will be referred to as candidate entries. Data buffer 62 checks the TRANSACTION TYPE field of each candidate entry to see if the contents of the TRANSACTION TYPE field identifies the transaction as a posted write transaction. If none of the candidate entries is a posted write transaction, host bridge 28 transmits a non-coherent target done (NTD) response packet to source I/O node 24A indicating that all posted write operations previously issued by I/O node 24A have at least reached points of coherency within processing subsystem 12.

On the other hand, if at least one of the candidate entries is a posted write transaction, host bridge 28 delays transmitting the NTD response packet to source I/O node 24A. Translation logic 60 may store the non-coherent data associated with the Flush command within data buffer 62. Translation logic 60 may use the contents of Cmd[5:0] to determine the packet conveys a Flush command, and may assign a corresponding value to a TRANSACTION TYPE identifier. Translation logic 60 may provide the TRANSACTION TYPE identifier, the contents of the unit ID field UnitID[4:0] of the Flush command packet, and the contents of the source tag field SrcTag[4:0] of the Flush command packet to data buffer 44. Data buffer 44 may store the value of the TRANSACTION TYPE identifier within the TRANSACTION TYPE field of an available (e.g., invalid) entry within table 64, the contents of the unit ID field UnitID[4:0] within the UNIT ID field of the entry, and the contents of the source tag field SrcTag[4:0] within the SOURCE TAG field of the non-coherent transaction data portion of the entry. It is noted that the SOURCE TAG field in the coherent transaction data portion of the Flush command entry may contain an unknown value. Data buffer 44 may also set valid bit V of the entry to "1" to indicate that the Flush command entry is valid.

The sixth row in Table 58 of FIG. 12 includes a single wait requirement: "TgtDone2 on the non-coherent link wait for TgtDone$_1$." In this example, the non-coherent target done (NTD) response packet must wait for a coherent target done (CTD) response packet from memory controller 22D. The posted write transaction storing data within memory 20D has not yet reached a point of coherency when I/O node 24A issues the Flush command. Table 64 (FIG. 3) includes a candidate entry corresponding to this posted write transaction, and host bridge 28 therefore delays transmitting the NTD response packet to source I/O node 24A. Memory controller 22D subsequently issues the coherent target done (CTD) response packet to host bridge 28 when the posted write transaction storing data within memory 20D reaches a point of coherency as described above.

Upon receiving the CTD response packet from memory controller 22D, data buffer 62 searches table 64 for the entry corresponding to the posted write transaction and invalidates the entry. During the search of table 64, data buffer 62 may note the presence of the valid Flush command entry within table 64. In response thereto, and following invalidation of the entry corresponding to the posted write transaction storing data within memory 20D, data buffer 62 may again search the valid entries of table 64 for a UNIT ID field containing a value which matches the contents of the UNIT ID field of the Flush command entry. Such a search may produce another set of candidate entries. Data buffer 62 may again check the TRANSACTION TYPE field of each candidate entry to see if the contents of the TRANSACTION TYPE field identifies the transaction as a posted write transaction. If at least one of the candidate entries within table 64 is a posted write transaction, data buffer 62 may take no further action at this time. On the other hand, if none of the candidate entries within table 64 is a posted write transaction, data buffer 62 may provide the contents of the UNIT ID field of the Flush command entry to translation logic 60 and invalidate the Flush command entry within table 64.

Host bridge 28 thus responds to the CTD response packet associated with the last valid posted write transaction issued by I/O node 24A by issuing the NTD response packet to source I/O node 24A. The NTD response packet indicates that all posted write operations issued by I/O node 24A prior to the Flush command have at least reached points of coherency within processing subsystem 12. I/O node 24A may thus continue with processing operations requiring previously issued posted write operations to have at least reached points of coherency within computer system 10. As a result, memory coherency and I/O ordering may be preserved within computer system 10.

FIGS. 8, 9, 14, 15, 17–21, and 23 illustrate packets for 8-bit coherent communication links. Packets for 16 and 32 bit links may be formed by concatenating consecutive bit times. For example, bit time 1 of a packet on a 16-bit link may comprise the information transmitted during bit times 1 and 2 on the 8-bit link. Similarly, bit time 1 of the packet on a 32-bit link may comprise the information transmitted during bit times 1–4 on the 8bit link.

Numerous variations and modifications will become apparent to those skilled in the art once the above disclosure is fully appreciated. It is intended that the following claims be interpreted to embrace all such variations and modifications.

What is claimed is:

1. A computer system, comprising:
    a processing subsystem including a plurality of processing nodes interconnected via coherent communication links, and wherein one of the processing nodes comprises a host bridge;
    an input/output (I/O) node coupled to the processing node including the host bridge via a non-coherent communication link, wherein the I/O node is configured to produce a first transaction and a second transaction, and wherein the first transaction precedes the second transaction;
    wherein the host bridge is configured to:
        receive the first and second transactions from the I/O node;
        dispatch the first transaction within the processing subsystem; and
        dispatch the second transaction within the processing subsystem dependent upon progress of the first transaction within the processing subsystem and a predetermined set of ordering rules.

2. The computer system as recited in claim 1, wherein the processing subsystem further comprises at least one memory, and wherein each of the at least one memory is coupled to a different one of the plurality of processing nodes.

3. The computer system as recited in claim 2, wherein the first transaction is a write transaction for storing data within a first of the at least one memory.

4. A computer system, comprising:
    a processing subsystem including a plurality of processing nodes interconnected via coherent communication links, and wherein one of the processing nodes comprises a host bridge;
    an input/output (I/O) node coupled to the processing node including the host bridge via a non-coherent communication link, wherein the I/O node is configured to produce a first transaction and a second transaction, and wherein the first transaction precedes the second transaction;
    wherein the host bridge is configured to:
        receive the first and second transactions from the I/O node;
        dispatch the first transaction within the processing subsystem; and
        delay completion of the second transaction with respect to the first transaction according to a predetermined set of ordering rules.

5. The computer system as recited in claim 4, wherein the processing subsystem further comprises a memory coupled to a first of the plurality of processing nodes.

6. The computer system as recited in claim 6, wherein the first transaction is a posted write transaction for storing data within the memory.

7. The computer system as recited in claim 6, wherein the first processing node is configured to produce a first target done packet directed to the host bridge in response to the first transaction.

8. The computer system as recited in claim 7, wherein the first processing node is configured to produce the first target done packet after the first transaction has reached a point of coherency within the computer system.

9. The computer system as recited in claim 8, wherein the first transaction has reached the point of coherency within the computer system when the first transaction is: (i) ordered within the first processing node with respect to other transactions pending within the first processing node, and (ii) a coherency state with respect to the first transaction has been established in the other processing nodes.

10. The computer system as recited in claim 6, wherein the I/O node is part of an I/O subsystem comprising a plurality of I/O nodes serially interconnected via non-coherent communication links.

11. The computer system as recited in claim 10, wherein the second transaction is a flush command, and wherein the first and second transactions have a common source within the I/O subsystem, and wherein the flush command ensures posted write transactions issued prior to the flush command by the source have at least reached points of coherency within the computer system.

12. The computer system as recited in claim 11, wherein the second transaction is completed when the host bridge dispatches a second target done packet to the source of the flush command.

13. The computer system as recited in claim 12, wherein according to the predetermined set of ordering rules, the host bridge is configured to dispatch the second target done packet to the source of the flush command in response to receiving the first target done packet.

14. The computer system as recited in claim 4, wherein each of the processing nodes comprises a processor core configured to execute instructions of a predefined instruction set.

15. A method in a computer system comprising a processing subsystem and an input/output (I/O) subsystem, the method comprising:
the I/O subsystem providing a first transaction and a second transaction to a host bridge of the processing subsystem;
the host bridge dispatching the first transaction within the processing subsystem; and
the host bridge dispatching the second transaction within the processing subsystem dependent upon progress of the first transaction within the processing subsystem and a predetermined set of ordering rules.

16. A method in a computer system comprising a processing subsystem and an input/output (I/O) subsystem, the method comprising:
the I/O subsystem providing a first transaction and a second transaction to a host bridge of the processing subsystem;
the host bridge dispatching the first transaction within the processing subsystem; and
the host bridge delaying completion of the second transaction with respect to the first transaction according to a predetermined set of ordering rules.

17. A node comprising:
a plurality of interface logic circuits, each of said plurality of interface logic circuits for coupling to a respective link, at least one of said respective links being a non-coherent link and remaining links being coherent links; and
a host bridge coupled to receive a first transaction from the non-coherent link and a subsequent second transaction from the non-coherent link, wherein the host bridge is configured to generate a third transaction corresponding to the first transaction for transmission on one of the coherent links, and wherein the host bridge is configured to generate a fourth transaction corresponding to the second transaction for transmission on one of the coherent links dependent on a progress of the third transaction and a predetermined set of ordering rules.

18. The node as recited in claim 17 wherein the host bridge is configured to convert the first transaction from a non-coherent packet format to a coherent packet format to generate the third transaction.

19. The node as recited in claim 17 wherein the first transaction and the second transaction each comprise write transactions.

20. The node as recited in claim 19 wherein the predetermined set of ordering rules includes a first rule that the third transaction be ordered in a receiving node of the third transaction prior to the fourth transaction being transmitted by the host bridge.

21. The node as recited in claim 20 wherein the host bridge is coupled to receive a target done packet corresponding to the fourth transaction and is configured to transmit a source done packet in response thereto, wherein the host bridge is configured to delay the transmission of the source done packet at least until the host bridge receives a target done packet corresponding to the third transaction.

22. A node comprising:
a plurality of interface logic circuits, each of said plurality of interface logic circuits for coupling to a respective link, at least one of said respective links being a non-coherent link and remaining links being coherent links; and
a host bridge coupled to receive a first transaction from the non-coherent link and a subsequent second transaction from the non-coherent link, wherein the host bridge is configured to generate a third transaction corresponding to the first transaction for transmission on one of the coherent links, and wherein the host bridge is configured to permit completion of the second transaction on the non-coherent link dependent on a progress of the third transaction and a predetermined set of ordering rules.

23. The node as recited in claim 22 wherein the first transaction comprises a posted write transaction.

24. The node as recited in claim 22 wherein the first transaction and the second transaction are each write transactions, and wherein the host bridge is configured to transmit a target done packet on the non-coherent link corresponding to the second transaction subsequent to receiving a target done packet corresponding to the first transaction from one of the coherent links.

25. The node as recited in claim 22 wherein the host bridge is configured to convert the first transaction from a non-coherent packet format to a coherent packet format to generate the third transaction.

26. A node comprising:
a plurality of interface logic circuits, each of said plurality of interface logic circuits for coupling to a respective link, at least one of said respective links being a non-coherent link and remaining links being coherent links; and
a host bridge coupled to receive a first transaction from the non-coherent link and a subsequent second transaction from the non-coherent link, wherein the host bridge is configured to generate a third transaction corresponding to the first transaction for transmission on one of the coherent links, and wherein the host bridge is configured to monitor progress of the third transaction and is configured to control progress of the second transaction responsive to the progress of the third transaction according to a predetermined set of order rules.

27. The node as recited in clam 26 wherein the host bridge is configured generate a fourth transaction corresponding to the second transaction for transmission on one of the coherent links, and wherein the host bridge is configured to cause the transmission of the fourth transaction responsive to the progress of the third transaction according to the predetermined set of ordering rules.

28. The node as recited in claim 27 wherein the first transaction and the second transaction each comprise write transactions.

29. The node as recited in claim 28 wherein the predetermined set of ordering rules includes a first rule that the third transaction be ordered in a receiving node of the third transaction prior to the fourth transaction being transmitted by the host bridge.

30. The node as recited in claim 29 wherein the host bridge is coupled to receive a target done packet corresponding to the fourth transaction and is configured to transmit a source done packet in response thereto, wherein the host bridge is configured to delay the transmission of the source done packet at least until the host bridge receives a target done packet corresponding to the third transaction.

31. The node as recited in claim 26 wherein the host bridge is configured to permit completion of the second transaction on the non-coherent link dependent on the progress of the third transaction and the predetermined set of ordering rules.

32. The node as recited in claim 31 wherein the first transaction comprises a posted write transaction.

33. The node as recited in claim 31 wherein the first transaction and the second transaction are each write transactions, and wherein the host bridge is configured to transmit a target done packet on the non-coherent link corresponding to the second transaction subsequent to receiving a target done packet corresponding to the first transaction from one of the coherent links.

34. The node as recited in claim 26 wherein the host bridge is configured to convert the first transaction from a non-coherent packet format to a coherent packet format to generate the third transaction.

35. A computer system comprising:
   a plurality of nodes interconnected using coherent links, wherein at least a first node of the plurality of nodes comprises a host bridge; and
   at least one non-coherent node coupled to the first node via a non-coherent link, wherein the non-coherent node is configured to transmit a first transaction and a subsequent second transaction to the first node on the non-coherent link, and wherein the host bridge is configured to generate a third transaction corresponding to the first transaction for transmission on one of the coherent links, and wherein the host bridge is configured to monitor progress of the third transaction and is configured to control progress of the second transaction responsive to the progress of the third transaction according to a predetermined set of ordering rules.

36. The computer system as recited in claim 35 wherein the host bridge is configured generate a fourth transaction corresponding to the second transaction for transmission on one of the coherent links, and wherein the host bridge is configured to cause the transmission of the fourth transaction responsive to the progress of the third transaction according to the predetermined set of ordering rules.

37. The computer system as recited in claim 36 wherein the first transaction and the second transaction each comprise write transactions.

38. The computer system as recited in claim 37 wherein the predetermined set of ordering rules includes a first rule that the third transaction be ordered in a receiving node of the third transaction prior to the fourth transaction being transmitted by the host bridge, the receiving node being one of the plurality of nodes.

39. The computer system as recited in claim 38 wherein the host bridge is coupled to receive a target done packet corresponding to the fourth transaction and is configured to transmit a source done packet in response thereto, wherein the host bridge is configured to delay the transmission of the source done packet at least until the host bridge receives a target done packet corresponding to the third transaction.

40. The computer system as recited in claim 35 wherein the host bridge is configured to permit completion of the second transaction on the non-coherent link dependent on the progress of the third transaction and the predetermined set of ordering rules.

41. The computer system as recited in claim 40 wherein the first transaction comprises a posted write transaction.

42. The computer system as recited in claim 40 wherein the first transaction and the second transaction are each write transactions, and wherein the host bridge is configured to transmit, a target done packet on the non-coherent link corresponding to the second transaction subsequent to receiving a target done packet corresponding to the first transaction from one of the coherent links.

43. The computer system as recited in claim 35 wherein the host bridge is configured to convert the first transaction from a non-coherent packet format to a coherent packet format to generate the third transaction.

* * * * *

UNITED STATES PATENT AND TRADEMARK OFFICE
CERTIFICATE OF CORRECTION

PATENT NO.    : 6,557,048 B1
DATED         : April 29, 2003
INVENTOR(S)   : Keller et al.

It is certified that error appears in the above-identified patent and that said Letters Patent is hereby corrected as shown below:

Column 26,
Line 65, please delete "claim 6" and insert -- claim 5 -- in place thereof.

Signed and Sealed this

Second Day of September, 2003

JAMES E. ROGAN
*Director of the United States Patent and Trademark Office*